(12) United States Patent
Mizuno

(10) Patent No.: US 7,385,877 B2
(45) Date of Patent: Jun. 10, 2008

(54) APPARATUS FOR TRANSPORTING DISCOID RECORD MEDIUM AND APPARATUS FOR RECORDING AND/OR REPRODUCTION

(75) Inventor: Hajime Mizuno, Chiba (JP)

(73) Assignee: Sony Corporation, Tokyo (JP)

( * ) Notice: Subject to any disclaimer, the term of this patent is extended or adjusted under 35 U.S.C. 154(b) by 610 days.

(21) Appl. No.: 10/451,783

(22) PCT Filed: Nov. 13, 2002

(86) PCT No.: PCT/JP02/11852

§ 371 (c)(1),
(2), (4) Date: Jul. 11, 2003

(87) PCT Pub. No.: WO03/042998

PCT Pub. Date: May 22, 2003

(65) Prior Publication Data

US 2004/0057345 A1 Mar. 25, 2004

(30) Foreign Application Priority Data

Nov. 13, 2001 (JP) .............................. 2001-347398

(51) Int. Cl.
*G11B 33/02* (2006.01)
(52) U.S. Cl. .................................. 368/30.9
(58) Field of Classification Search ............... None
See application file for complete search history.

(56) References Cited

U.S. PATENT DOCUMENTS

| | | | | |
|---|---|---|---|---|
| 4,979,160 A | * | 12/1990 | Araki | 720/621 |
| 5,502,697 A | * | 3/1996 | Taki | 369/30.33 |
| 5,822,296 A | * | 10/1998 | Nakamichi | 720/615 |
| 6,222,811 B1 | * | 4/2001 | Sakurai et al. | 720/620 |
| 6,463,025 B1 | * | 10/2002 | Scholz | 720/622 |
| 6,587,406 B1 | * | 7/2003 | Nakamichi | 369/30.85 |
| 6,880,160 B1 | * | 4/2005 | Lee et al. | 720/623 |
| 2002/0018437 A1 | * | 2/2002 | Kletzl | 369/192 |

FOREIGN PATENT DOCUMENTS

| | | |
|---|---|---|
| JP | 8-180560 | 7/1996 |
| JP | 11-203762 | 7/1999 |

* cited by examiner

*Primary Examiner*—A. J. Heinz
*Assistant Examiner*—Mark Blouin
(74) *Attorney, Agent, or Firm*—Oblon, Spivak, McClelland, Maier & Neustadt, P.C.

(57) ABSTRACT

A transport apparatus for a disc-shaped recording medium (2) includes a first transport mechanism (9a) for transporting a first disc (2L) and a second disc (2S) smaller in diameter than the first disc (2L) from a loading position to a reproducing or recording position, and a second transport mechanism (9b) arranged at a position spaced from the second disc (2S) transported to the reproducing or recording position. The second transport mechanism transports the first disc-shaped recording medium, transported by the first transport mechanism (9a) to the reproducing or recording position, to a housing position, and performs control over similar transport of the second disc (2S).

11 Claims, 27 Drawing Sheets

APPARATUS FOR TRANSPORTING DISCOID RECORD MEDIUM AND APPARATUS FOR RECORDING AND/OR REPRODUCTION

This application is a 371 of PCT/JP02/11852 Nov. 13, 2002.

TECHNICAL FIELD

This invention relates to a transporting apparatus for transporting plural sorts of disc-shaped recording mediums of different diameters, and to a recording and/or reproducing apparatus employing this transporting apparatus.

This application claims priority of Japanese Patent Application No. 2001-347398, filed on Nov. 13, 2001, the entirety of which is incorated by reference herein.

BACKGROUND ART

Conventionally, an apparatus employing a disc-shaped recording medium, such as an optical disc, is provided with a loading mechanism for loading a disc, as an information recording medium, on a reproducing unit or on a recording unit within the main body unit of the apparatus. For the loading mechanism, provided to the recording and/or reproducing apparatus, a tray system and a slot-in system are used.

The loading mechanism of the tray system loads a disc thereon using a tray movable across the inner and outer sides of the main body unit of the apparatus. In this loading mechanism, a disc is set on a tray pulled out to a loading/unloading position outside the main body unit of the apparatus, and pulls the tray into the inside of the main body unit of the apparatus, such that the disc set on the tray is moved onto a reproducing unit or a recording unit to effect disc loading.

The loading mechanism of the tray system is in need of two-stage operations, namely an operation of causing movement of the tray, carrying the disc, across the inner and outer sides of the main body unit of the apparatus, and an operation of causing movement of the disc on the tray in a direction perpendicular to the direction of tray movement to chuck the disc on a rotational driving mechanism of the reproducing unit or the recording unit.

On the other hand, the loading mechanism of the slot-in system only needs to introduce the disc via a disc insertion opening provided in the main body unit of the apparatus, the disc being then transported to the reproducing unit or the recording unit by a transport mechanism provided in the main body unit of the apparatus so as to be then chucked on the rotational driving mechanism of the reproducing unit or the recording unit. With the loading mechanism of the slot-in system, in which there is no necessity of employing a tray, the recording and/or reproducing apparatus itself can be reduced in thickness, while only a small amount of operations is required for loading the disc, thus assuring facilitated disc loading operations.

As for the recording and/or reproducing apparatus, employing a disc-shaped recording medium, such as an optical disc, as a recording medium, such a recording and/or reproducing apparatus has been proposed which is provided with a disc exchanging function such that a plural number of discs are housed in a housing section at the outset and a desired one of the discs is selected for recording and/or reproducing information signals. The recording and/or reproducing apparatus provided with this sort of the disc exchanging function may be exemplified by an apparatus disclosed in the Japanese Laying-Open Patent Publication H-11-203761.

The recording and/or reproducing apparatus, disclosed in this Publication, includes a housing section in which can be accommodated a plural number of Compact Discs as optical discs with a diameter of 12 cm. This recording and/or reproducing apparatus includes a transport mechanism which is able to transport the discs, introduced into the main body unit of the apparatus via a slot provided therein, to the reproducing unit. The recording and/or reproducing apparatus also includes a mechanism for transferring the discs not in use to a standby position in the housing section in the main body unit of the apparatus. The mechanism for transferring the discs to the housing section in the main body unit of the apparatus includes the function of transferring the discs housed in the housing section to the reproducing section for loading thereon subject to selection by a user.

Meanwhile, as a disc-shaped recording medium, for example, an optical disc, in particular a Compact Disc, a disc with a diameter of 12 cm and a disc with a diameter of 8 cm, is used. If the disc with different diameters are used on the same recording and/or reproducing apparatus, and the disc transport device is of, for example, the slot-in type, the following problems, namely (1) difficulties in positioning the discs in the standby position ready for chucking the disc to the reproducing unit;
(2) difficulties in loading the discs between the reproducing unit and the loading unit; and
(3) difficulties in arraying the discs in accommodating the discs in the disc housing unit are encountered.

First, in (1), that is in positioning the disc in a standby position ready for chucking the discs in a reproducing unit, there is presented no problem in the case of an apparatus not having a disc exchanging function, that is in a recording and/or reproducing apparatus in which only one disc is housed and loaded on a recording unit or a reproducing unit for recording or reproducing information signals.

In (2), there is similarly presented no problem in connection with disc transport. However, in case (1) and (2) above are added together, difficulties become outstanding, such that it becomes difficult to overcome the both of the problems simultaneously. For example, in order to handle two disc sorts of different diameters, there are required a mechanism for transferring the respective discs from an insertion opening to the reproducing unit and a mechanism for transferring the disc from the disc housing position in the apparatus to the reproducing unit, thus complicating the mechanism for holding and positioning the two discs of different sorts.

In (3), the arraying difficulties presented are associated with the difficulties met in providing a mechanism for arraying a disc with a diameter of 12 cm and a disc with a diameter of 8 cm within a housing section for the two discs of different diameters.

For overcoming these difficulties, complicated mechanical designing is required, as a result of which the number of components and the cost are necessarily increased.

In using a disc with a diameter of 8 cm, an adapter for changing the diameter to 12 cm may be used for compatibility with the disc 12 cm in diameter. In this case, it is sufficient to provide a housing section or a transporting mechanism for a disc 12 cm in diameter. However, if such adapter is used for effectively changing the outside diameter of the disc, difficulties are presented in positively mounting the disc to the adapter. Moreover, the operation is complicated because the user has to load the disc to the adapter. In addition, means must be provided to prevent an inconvenience when a disc 8 cm in diameter is introduced inadvertently via insertion opening without being loaded on the adapter.

DISCLOSURE OF THE INVENTION

It is therefore an object of the present invention to provide a novel transport apparatus for a disc-shaped recording medium and a recording and/or reproducing apparatus employing this transport apparatus, whereby the aforementioned problems inherent in the recording and/or reproducing apparatus may be overcome.

It is another object of the present invention to provide a transport apparatus for a disc-shaped recording medium in which plural disc-shaped recording mediums with different diameters may be used simultaneously, and a recording and/or reproducing apparatus employing this transport apparatus, in which it is possible to simplify the mechanism, lower the cost and to improve the reliability.

The present invention provides a transport apparatus for a disc-shaped recording medium comprising a first transport mechanism for transporting a first disc-shaped recording medium and a second disc-shaped recording medium smaller in diameter than the first disc-shaped recording medium from a loading position to a reproducing or recording position, and a second transport mechanism arranged at a position spaced from the second disc transported to the reproducing or recording position; the second transport mechanism transporting the first disc-shaped recording medium, transported by the first transport mechanism to the reproducing or recording position, to a housing position.

The second transport mechanism is arranged at a position engaging with the first disc-shaped recording medium transported to the reproducing or recording position. The first transport mechanism and the second transport mechanism are spaced a distance larger than the diameter of the second disc-shaped recording medium and smaller than the diameter of the first disc-shaped recording medium.

The present invention also provides a recording and/or reproducing apparatus for a disc-shaped recording medium comprising a first transport mechanism for transporting a first disc-shaped recording medium and a second disc-shaped recording medium smaller in diameter than the first disc-shaped recording medium from a loading position to a reproducing or recording position, a second transport mechanism arranged at a position spaced apart from the second disc transported to the reproducing or recording position, and adapted for transporting the first disc-shaped recording medium, transported by the first transport mechanism to the reproducing or recording position, to a housing position, a reproducing or recording unit for reproducing or recording the disc-shaped recording medium, transported by the first transport mechanism to the reproducing or recording position, and a housing section for housing the first disc-shaped recording medium transported by the second transport mechanism.

In the recording and/or reproducing apparatus, the first disc-shaped recording medium or the second disc-shaped recording medium is transported substantially horizontally by the first transport mechanism and the second transport mechanism between the loading position, the reproducing or recording position and the housing position.

Other objects, features and advantages of the present invention will become more apparent from reading the embodiments of the present invention as shown in the drawings.

BEST MODE FOR CARRYING OUT THE INVENTION

This invention is relative to a loading mechanism for a disc-shaped recording medium, allowing the use of plural sorts of the disc-shaped recording mediums with different diameters, a recording and/or reproducing apparatus employing the loading mechanism, and to a disc apparatus employing a discs exchanging mechanism, that is a changer mechanism, and may find application in audio, video equipment or computer equipment. In particular, the present invention allows the disc-shaped recording medium to be loaded on a recording or reproducing unit for recording or reproduction, without using an auxiliary member, such as an adapter, as the shape proper to the disc-shaped recording medium is maintained, with a view to effectively unifying the size of the disc-shaped recording medium having different outside diameters.

The recording and/or reproducing apparatus according to the present invention is configured so that a first disc having a specified diameter may be transported to a housing position, while a second disc, smaller in diameter than the first disc, is not transported to the housing position. In implementing this configuration, mechanical limitations are imposed on the second disc to simplify the structure.

Figure 1:
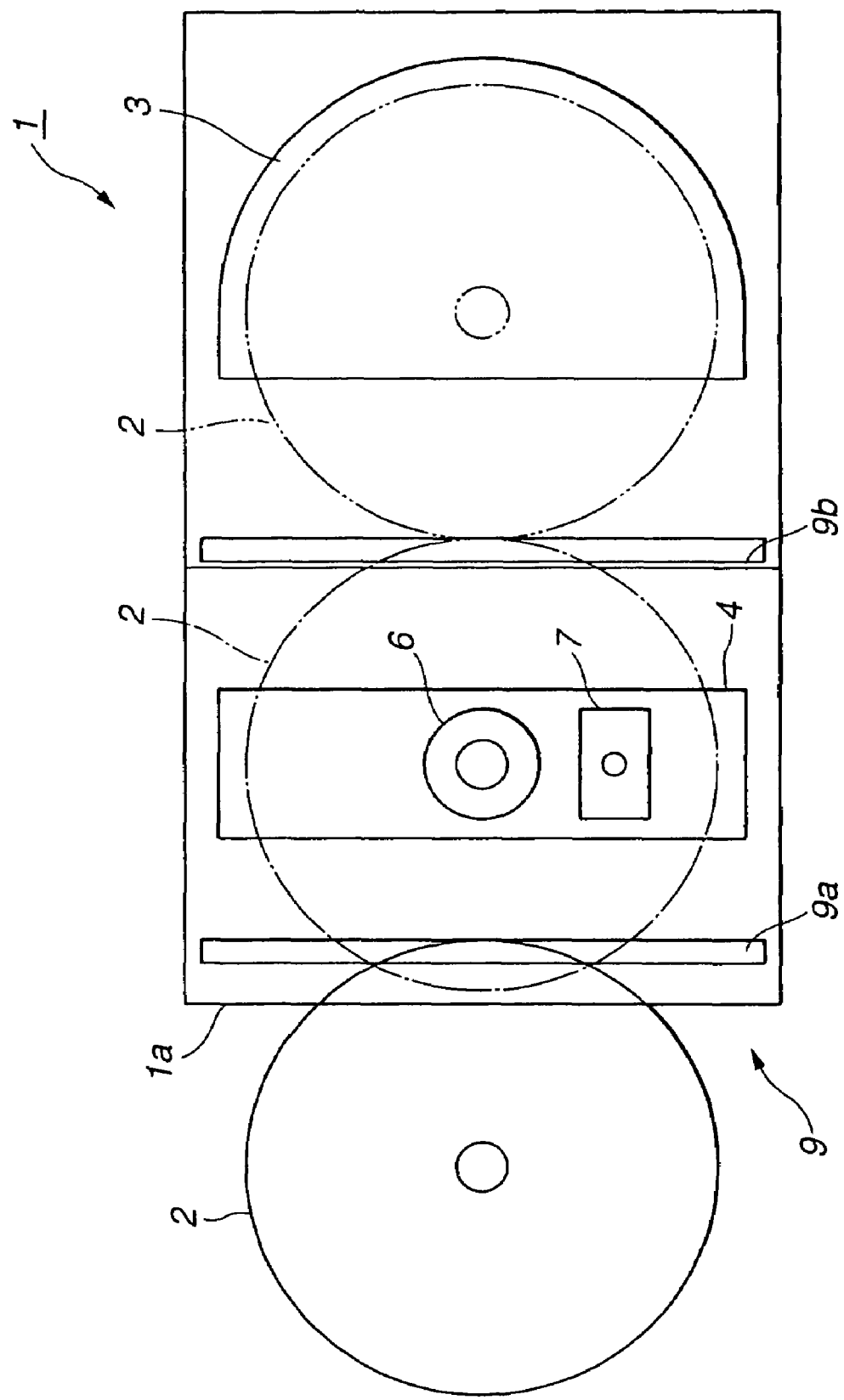
FIG. 1 is a plan view showing an instance of application of a recording and/or reproducing apparatus according to the present invention to a disc apparatus having a disc exchanging function.
Figure 2:
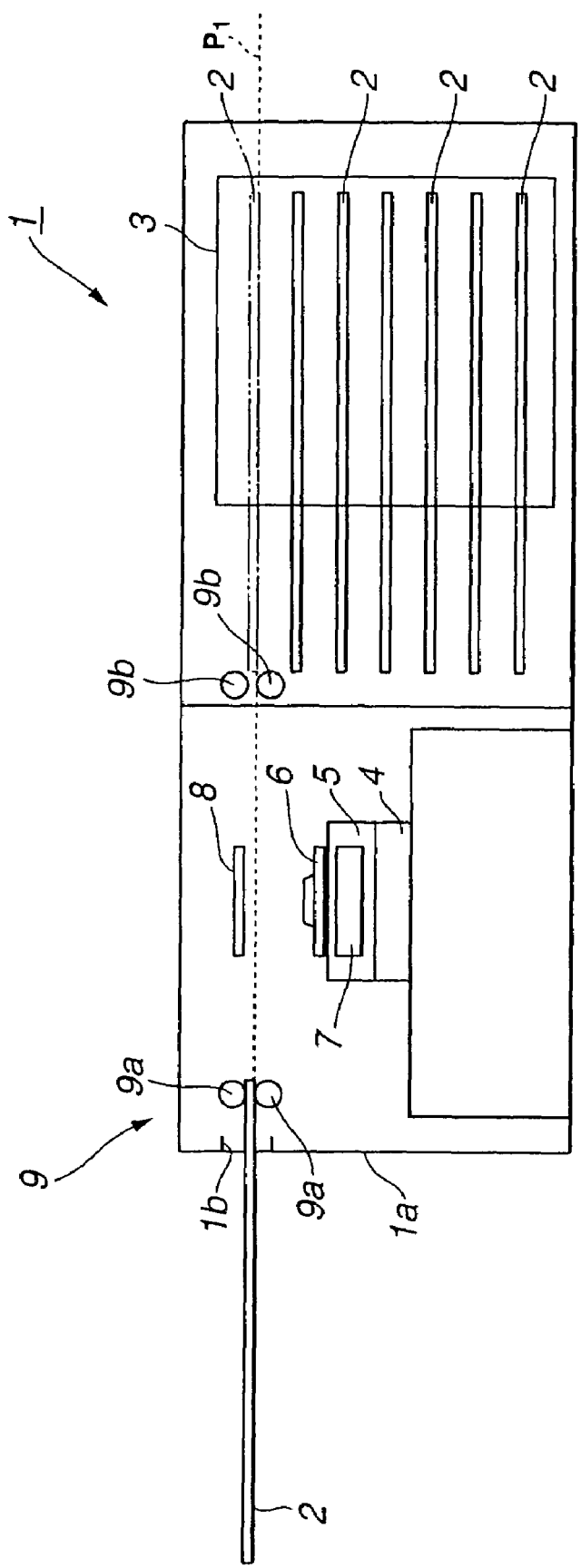
FIG. 2 is a side view showing the state of introducing a disc-shaped recording medium via an inserting opening into the main body unit of the apparatus.
Figure 3:
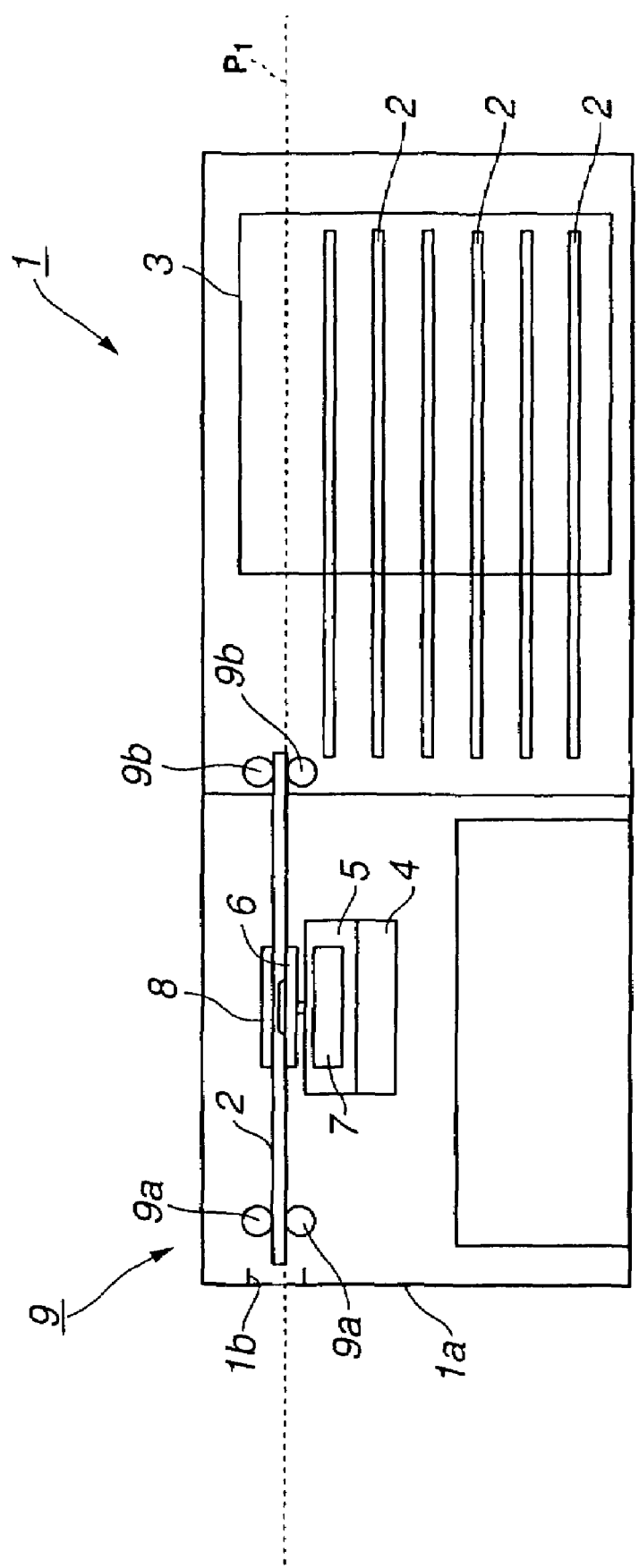
FIG. 3 is a side view showing the state in which the disc-shaped recording medium has been transported to the recording or reproducing position.

FIGS. 1 to 3 illustrate a recording and/or reproducing apparatus 1 having the loading mechanism according to the present invention, as a typical example of application to a disc apparatus having a changer mechanism.

The "recording and/or reproducing apparatus" means both an apparatus for recording or reproducing information signals and an apparatus for recording and reproducing information signals. A disc-shaped recording medium 2, shown in the drawing, includes a replay-only optical disc, a magneto-optical disc enabling re-recording information signals a number of times and a phase change optical disc enabling recording of information signals, without regard to the recording system or recording configuration.

FIG. 1 depicts a schematic plan view showing a recording and/or reproducing apparatus embodying the present invention, in which the state of a disc-shaped recording medium 2 in an eject position is indicated by a solid line, that in a recording and/or reproducing position is indicated by a chain-dotted line, and that in a housing position is indicated by a double dotted chain line. Since the illustrative embodiment is a disc apparatus having a changer mechanism, a housing section 3 is provided for accommodating the disc-shaped recording medium 2. The recording and/or reproducing apparatus embodying the present invention is not limited to an apparatus including this housing section 3. It is sufficient that there is provided a housing section for the disc-shaped recording medium 2 within a casing 1a making up the main body unit of the apparatus, and that the housing position for the disc-shaped recording medium 2 is different from the recording and/or reproducing or recording position. Moreover, the present invention is not limited to a recording and/or reproducing apparatus capable of accommodating plural disc-shaped recording mediums.

FIGS. 2 and 3 schematically show the inner structure of the recording and/or reproducing apparatus 1 from its lateral side. Specifically, FIG. 2 shows the state in which the disc-shaped recording medium 2 is inserted into the apparatus via an inserting opening (slot) 1b of the casing 1a, while FIG. 3 shows the state in which the disc-shaped recording medium 2 has been transported to the recording and/or reproducing position. Meanwhile, a dotted line $P_1$ in FIGS. 2 and 3 indicates a transport reference line for the disc-shaped recording medium 2.

The casing 1a is provided with a reproducing or recording unit 4 for reproducing or recording information signals from or on the disc-shaped recording medium 2. The reproducing or recording unit 4 includes a rotational driving unit having a turntable 6 on which to mount the disc-shaped recording medium 2 and a spindle motor 5 for rotationally driving the disc-shaped recording medium 2 along with the turntable 6, and a head unit 7 for reproducing the information signals recorded on the disc-shaped recording medium 2 rotationally driven by the rotationally driving unit or recording the information signals on the disc-shaped recording medium 2.

The spindle motor 5 of the rotational driving unit causes rotation of the disc-shaped recording medium 2 set on the turntable 6 at a constant linear velocity. The rotational driving unit includes a damper 8 for clamping the disc-shaped recording medium 2, set on the turntable 6, for rotation in unison with the turntable 6.

In case the disc apparatus of the present invention is of the optical recording and/or reproducing system employing an optical disc as a recording medium, an optical pickup is used in the head unit 7. The optical pickup includes a light source for radiating a light beam, an objective lens for condensing the light beam radiated from the light source for illuminating the condensed light beam on the disc-shaped recording medium, and a photodetector for detecting the return light beam reflected back from the disc-shaped recording medium. The optical pickup includes an electro-magnetic actuator for actuating the objective lens in a focusing direction parallel to the optical axis and in a tracking direction which is the planar direction perpendicular to the optical axis of the objective lens, based on the focusing error signals and tracking error signals. The optical pickup is moved by a feed mechanism in the radial direction of the disc-shaped recording medium rotationally driven by the rotational driving unit.

Although the recording and/or reproducing apparatus 1 shown in FIGS. 1 to 3 includes a mechanism for displacing the rotational driving unit, the head unit 7 and the clamper 8 towards and away from the disc-shaped recording medium 2 being transported, this mechanism may be of any suitable known type and hence the description thereof is omitted for simplicity.

The recording and/or reproducing apparatus 1 according to the present invention includes a loading mechanism 9 for transporting the disc-shaped recording medium 2 from outside the casing 1a to the housing unit 3 in the casing 1a. The loading mechanism 9 includes a first transporting mechanism 9a and a second transporting mechanism 9b. In the illustrated embodiment, transport rolls are used as the first transporting mechanism 9a and the second transporting mechanism 9b. However, various other transporting configurations may be used, as will be explained subsequently.

The first transporting mechanism 9a is provided in proximity to the inserting opening 1b in the casing 1a. The first transporting mechanism 9a transports the disc-shaped recording medium 2, inserted via inserting opening 1b into the casing 1a, from the inserting opening 1b up to the reproducing or recording position.

It should be noted that FIG. 3 shows the state in which the disc-shaped recording medium 2, transferred to the reproducing or recording position, is set on the turntable 6, and has its mid portion clamped by the damper 8 along with the turntable 6. At this time, the disc-shaped recording medium 2 has its rim sandwiched between the first and second transporting mechanisms 9a, 9b. During rotation of the disc-shaped recording medium 2, these transporting mechanisms 9a, 9b are receded away from the disc-shaped recording medium 2 to a position not obstructing its rotation.

The second transporting mechanism 9b is provided intermediate between the reproducing or recording position and the housing position to transport the disc-shaped recording medium 2 from the reproducing or recording position towards the housing position. In FIG. 2, the disc-shaped recording medium 2, transported to the housing section 3, is indicated by a double-dotted chain line. In FIGS. 2 and 3, guide members etc., necessary for transporting the disc-shaped recording medium 2, are not shown. However, these auxiliary means are, of course, provided as necessary.

In the housing section 3, an uplifting unit, for example, is provided for positioning the plural disc-shaped recording mediums 2 in their respective housing portions. The uplifting mechanism used may be of any known type used in a recording and/or reproducing apparatus provided with a disc exchanging mechanism and hence is not explained specifically. That is, in the recording and/or reproducing apparatus according to the present invention, the disc-shaped recording medium may be housed in any desired manner in the housing section 3 and hence the housing configuration is merely conceptually shown in the drawings without depicting its detailed mechanical structure.

The signal processing and the control system of the recording and/or reproducing apparatus 1, embodying the present invention, is now explained with reference to FIG. 4.

Figure 4:
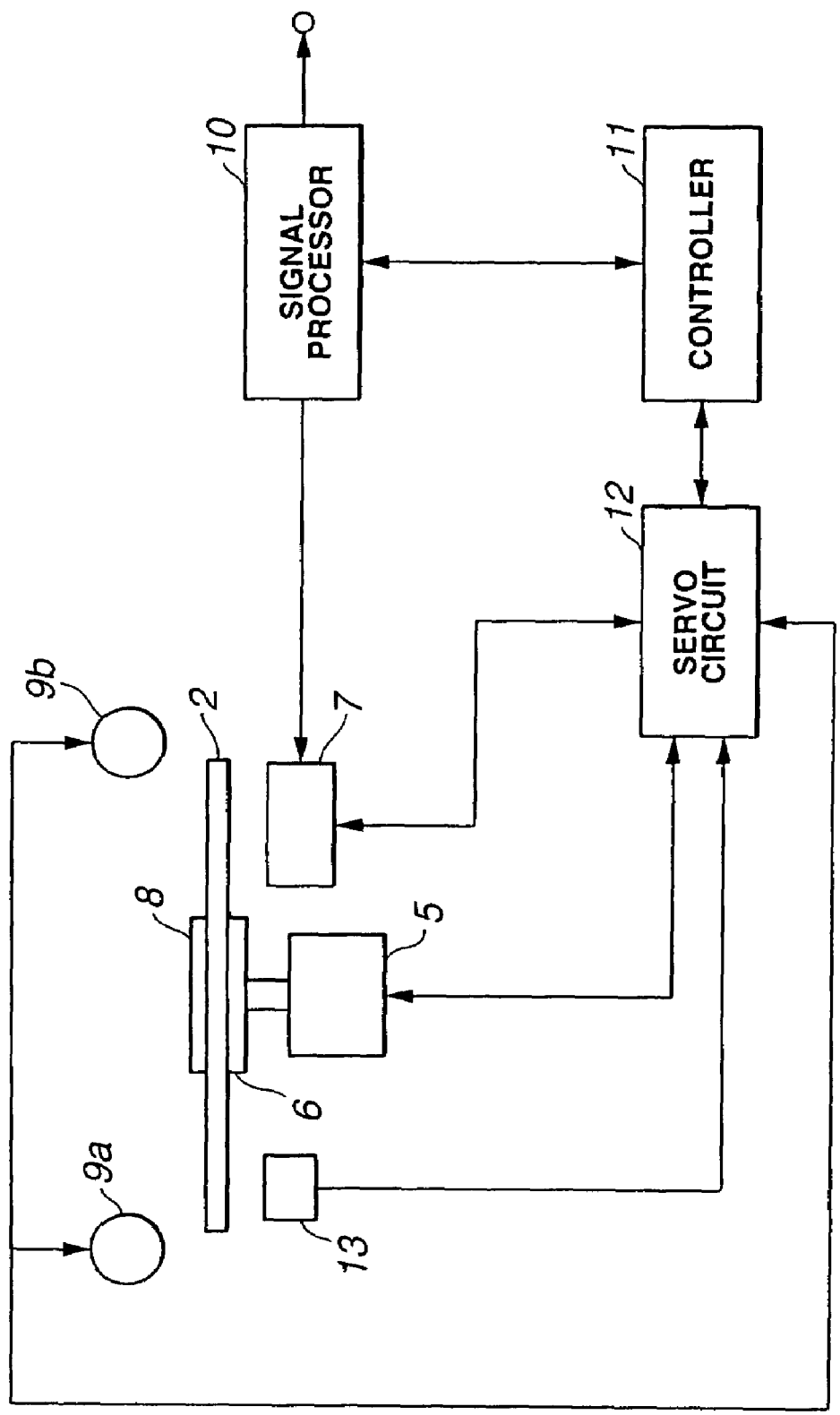
FIG. 4 is a block diagram showing a circuit structure of the recording and/or reproducing apparatus according to the present invention.

The recording and/or reproducing apparatus 1 of the present invention, shown in FIG. 4, includes a signal processor 10, inclusive of an encoder and a decoder, for recording or reproducing information signals on or from the disc-shaped recording medium 2, clamped on the turntable 6 by the damper 8 and rotated at a constant linear velocity by rotation of the spindle motor 5 in unison with the turntable 6, by the head unit 7, adapted for scanning the signal recording region of the disc-shaped recording medium 2 with a light beam. The signal processor 10 is controlled by a controller 11 including a CPU (central processing unit) and a memory.

The first transporting mechanism 9a and the second transporting mechanism 9b of the loading mechanism 9 transport the disc-shaped recording medium 2 from the loading position at the inserting opening 1b of the casing 1a to the recording or reproducing position, from the recording or reproducing position to the housing position, from the housing position to the recording or reproducing position and from the recording or reproducing position to the loading position, under control signals from the controller 11.

There are provided a spindle motor 5 for rotationally driving the disc-shaped recording medium 2 at a constant linear velocity and a servo circuit 12 for controlling the driving of the head unit 7 and a driving source of a mechanism of the first transporting mechanism 9a and the second transporting mechanism 9b, such as a driving motor. The head unit 7 scans the signal recording region of the disc-shaped recording medium 2, rotationally driven by the spindle motor 5, with a light beam. The servo circuit 12 is responsive to a control command from the controller 11 to perform focusing control, tracking control or the feed control by the electromagnetic actuator of the head unit 7. Additionally, the servo circuit performs rotational control of the spindle motor 5, responsible for rotationally driving the disc-shaped recording medium 2, while performing transport control of the disc-shaped recording medium 2 by the first transporting mechanism 9a and the second transporting mechanism 9b.

The recording and/or reproducing apparatus 1 of the present invention also includes a sensor 13 for detecting the loading state of the disc-shaped recording medium 2, that is whether or not the disc-shaped recording medium 2 has been loaded in position, and for detecting the difference in diameter of the disc-shaped recording medium 2 inserted into the casing 1a. The sensor 13 is made up by e.g., a photosensor. The sensor 13 outputs detection signals which are routed to the servo circuit 12 and thence supplied to the controller 11. Based on a detection signal from the sensor 13, the servo circuit 12 controls the driving of the first transporting mechanism 9a and the second transporting mechanism 9b to control the transport of the disc-shaped recording medium 2. These various operations will be explained in detail subsequently.

The mechanical units provided in the housing section 3 accommodating the disc-shaped recording medium 2 being transported to take charge of moving the disc-shaped recording medium 2 or transporting the disc-shaped recording medium to the disc housing position in the housing section 3, and a controller for controlling the operation of the mechanical units, are omitted from the drawing. In addition, the structure necessary for the operation of the recording and/or reproducing apparatus 1 of the present invention, such as an operating unit, a display unit, an interfacing circuit unit or a power supply circuit unit, are also omitted from the drawing.

The loading device 9 embodying the present invention and the recording and/or reproducing apparatus 1 provided with this loading device 9 are presupposed to be used with plural disc-shaped recording mediums with different diameters, as described above. Thus, in the following explanation, an embodiment is explained in which two disc sorts with different disc diameters are used.

One of the two disc sorts is termed a [first disc], while the other disc, smaller in diameter than the first disc, is termed a [second disc]. That is, if the first and second discs are compared to each other as to the diameter, the first disc is a disc of a larger diameter, while the second disc is a disc of a lesser diameter. In case the disc-shaped recording medium is the Compact Disc, the first disc is a disc with a diameter of 12 cm, while the second disc is a disc with a diameter of 8 cm.

With the loading device 9 of the present invention, the first and second discs are transported by the first transporting mechanism 9a between the reproducing or recording position and the loading or eject position. In transporting the first and second discs, that is disc-shaped recording mediums 2 with respective different diameters, in the clamped state, the transport configuration may be exemplified by such a one transporting the disc-shaped recording medium 2, the upper and lower surfaces of which are clamped in the up-and-down direction by plural rolls 14, as shown in FIG. 5, and such a one transporting the disc-shaped recording medium 2 the outer rim of which is clamped from left and right sides by plural rolls 15, as shown in FIG. 6.

Figure 5:
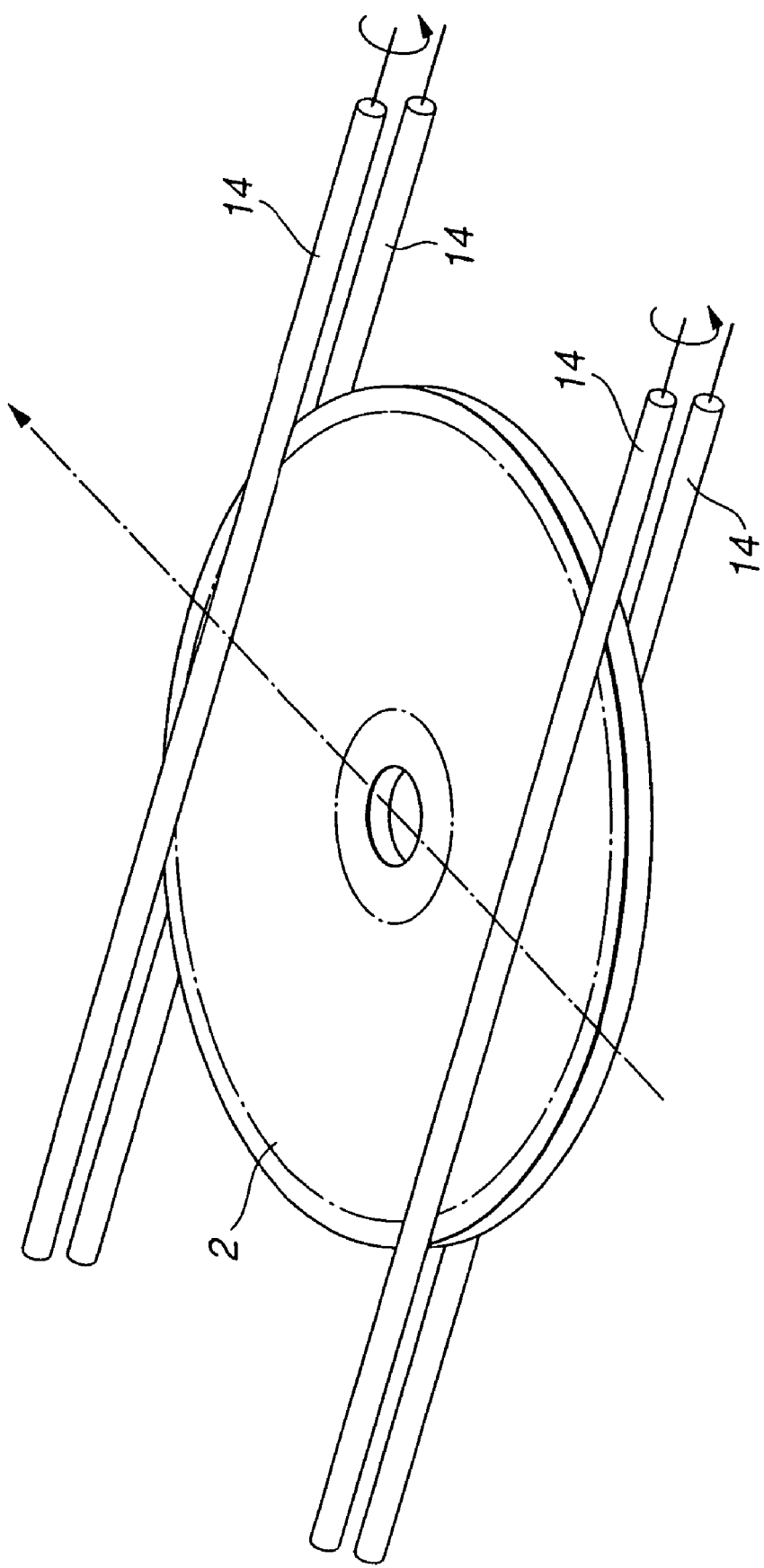
FIG. 5 is a perspective view showing an instance of a transporting mechanism.
Figure 6:
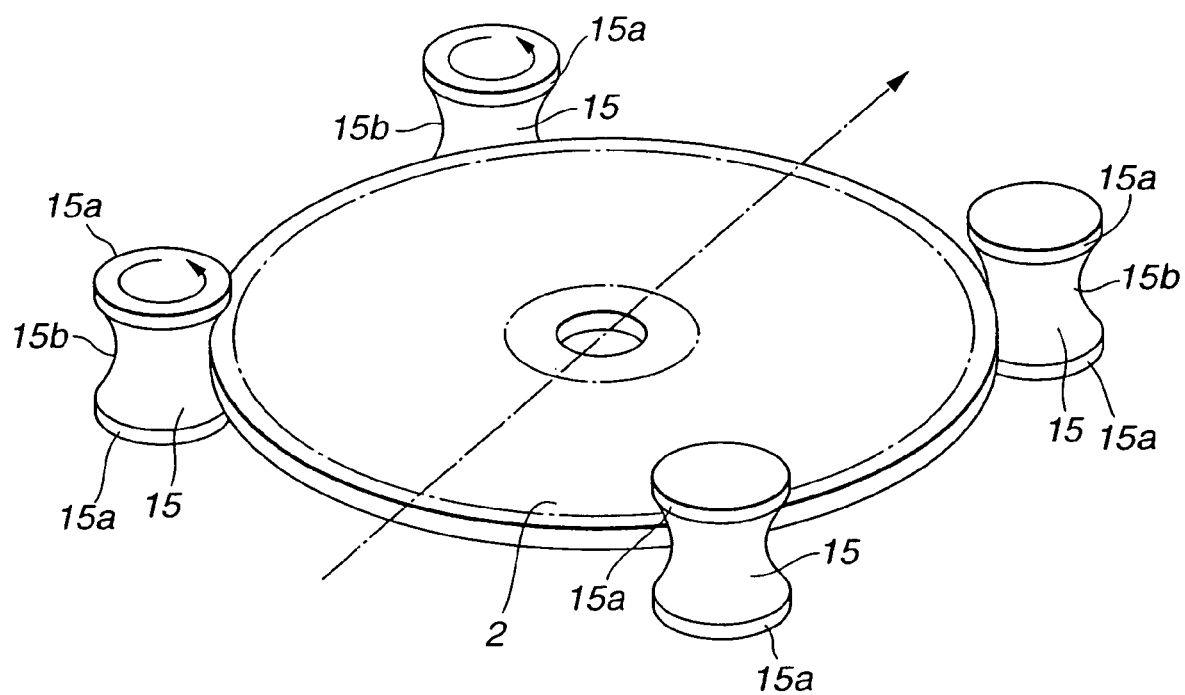
FIG. 6 is a perspective view showing another instance of a transporting mechanism.

In the configuration shown in FIG. 5, the respective rolls 14 are arranged with the rotational axes thereof parallel to the upper and lower surfaces of the disc-shaped recording medium 2, whereas, in the configuration shown in FIG. 6, the respective rolls 15 are arranged with the rotational axes thereof perpendicular to the upper and lower surfaces of the disc-shaped recording medium 2.

That is, in the configuration shown in FIG. 5, the plural rolls 14, in the form of elongated rods, are arranged in pairs on the upper and lower sides of the disc-shaped recording medium 2, so that the disc-shaped recording medium 2 is transported by being clamped between the plural pairs of the rolls 14, 14. For example, one of the roll pairs operates as driving rolls, while the other roll pair operates as follower rolls.

In the configuration shown in FIG. 6, plural roll pairs 15 are used, each roll having a small diameter portion 15b delimited by two large diameter portions 15a on both sides thereof. The small diameter portions of the rolls 15 are abutted against the rim of the disc-shaped recording medium 2. The respective roll 15 are then rotated to transport the disc-shaped recording medium 2 clamped in-between the large diameter portions. One of the paired rolls is a driving roll, with the other roll being a follower roll. The configuration of transporting the disc-shaped recording medium by clamping its outer rim is not limited to the configuration described above, such that the configuration of employing a belt member or the configuration of employing a feed unit mounted upright on a rotational member, as later explained, may also be used.

At any rate, in applying the mechanism employing the rolls 14 shown in FIG. 5 or the mechanism employing the rotational rolls 15 shown in FIG. 6, as the first and second transport mechanisms 9a, 9b, a driving source may separately be provided for each of the first and second transport mechanisms 9a, 9b, for independent driving. Alternatively, the driving power may be branched from a common driving source and transmitted to each of the first and second transport mechanisms 9a, 9b. For reducing the size and simplifying the structure of the loading device 9 employing the first and second transport mechanisms 9a, 9b, and the recording and/or reproducing apparatus 1 employing this loading device 9, the system driving the first and second transport mechanisms 9a, 9b by the common driving source is more desirable.

According to the present invention, such mechanical limitations are imposed that, while the first disc is transported by the second transporting mechanism 9b between the reproducing or recording position and the housing position, the second disc, smaller in diameter than the first disc, is not transported between the reproducing or recording position and the housing position. It is noted that the second transporting mechanism 9b is arranged at a location mechanically spaced apart from the second disc arranged in the reproducing or recording position to prevent the second disc from being inadvertently transported to its housing section by the second transporting mechanism 9b.

Meanwhile, if simply the second disc is to be prohibited from being transported by the second transporting mechanism 9b, it is sufficient to provide means for detecting the difference between the first and second discs and to prohibit the operation of the second transporting mechanism 9b when the target disc has been found to be the second disc. In this method, no suitable countermeasures could be taken if, due to the erroneous operation or mistaken discrimination between the first and second discs, the second disc has been transported to the housing position. That is, with the method of discriminating the disc diameters, mistaken transport caused by error in disc diameter discrimination cannot be prohibited reliably.

Thus, according to the present invention, the first and second discs are transported by the first transporting mechanism 9a between the reproducing or recording position and the loading or eject position, while only the large diameter first disc is transported by the second transporting mechanism 9b between the reproducing or recording position and the loading or eject position. In this manner, the first disc is reproduced or recorded and housed in the housing section 3 provided in the apparatus, whereas the second disc is only reproduced or recorded but transfer thereof to the housing section 3 is prohibited. As a consequence, it is possible to prevent an inconvenience that the second disc not scheduled to be housed in the housing section 3 is erroneously transferred to the housing section 3 so as to be accommodated in position therein.

The configurations of the first and second transporting mechanisms are now explained. Specifically, there are the following configurations:

(I) The configuration in which upper and lower columnar-shaped rolls are used as respective transport means and the disc-shaped recording medium is transported as the upper and lower sides thereof are clamped by the paired rolls;

(II) the configuration in which rotational rolls (feed rolls) are used as respective transport means and the disc-shaped recording medium is transported as the rolls are thrust onto the outer rim of the disc-shaped recording medium;

(III) the configuration in which rolls and a belt are used as respective transport means and the disc-shaped recording medium is transported as the rolls are thrust onto the outer rim of the disc-shaped recording medium; and (IV) the configuration in which rotational members having feed units are used as respective transport means and the disc-shaped recording medium is transported as the rotational members are thrust onto the outer rim of the disc-shaped recording medium.

The configuration (I) is now explained with reference to FIGS. 7 to 11.

Figure 7:
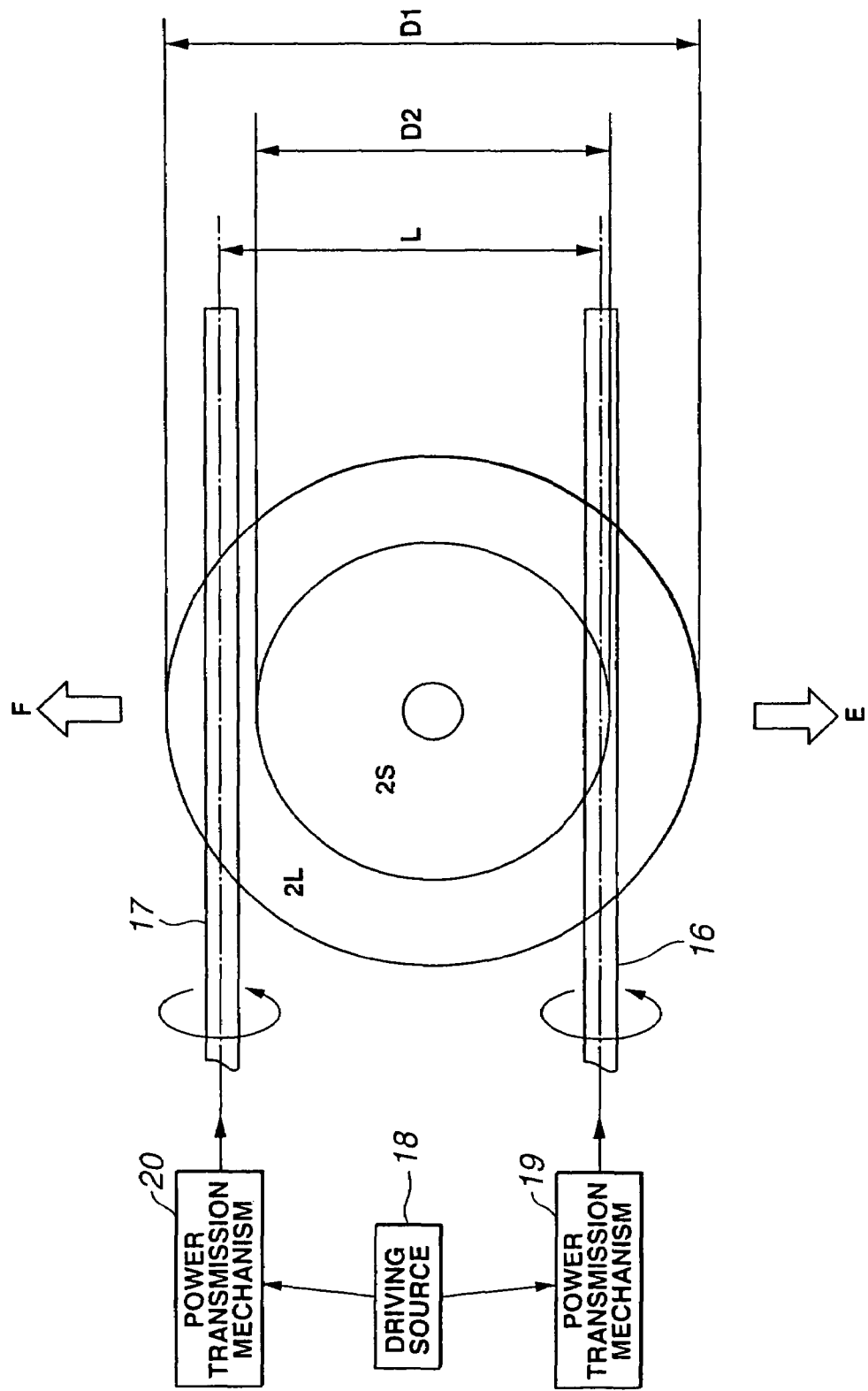
FIG. 7 is a plan view showing a transporting mechanism employing a cylindrically-shaped roll and specifically showing the position relationships between first and second discs of different diameters and two roll pairs.

In FIG. 7, a pair of rolls 16, 16 and another pair of rolls 17, 17, with each roll having an axis of rotation within the plane of the drawing sheet, are arranged at a preset spacing from each other.

In FIG. 7, an arrow with an arrowhead F pointing up indicates the direction of housing the disc-shaped recording medium in the housing section 3, whilst an arrow with an arrowhead E pointing down indicates the direction of ejecting the disc-shaped recording medium. The paired rolls 16, 16 make up the first transporting mechanism 9a, whilst the paired rolls 17, 17 make up the second transporting mechanism 9b. It is noted that the driving power from a common driving source 18 is transmitted through motive power transmitting mechanisms 19, 20 to the paired rolls 16, 16 and the paired rolls 17, 17, respectively. Meanwhile, one of the rolls 16, 16 disposed on the lower side of the disc-shaped recording medium is not shown for convenience in the drawing. The same applies for the other rolled pairs 17, 17.

In FIG. 7, [D1], [D2] and [L] indicate the diameter of a second disc 2L, the diameter of the second disc 2S ([D1>D2]) and the center-to-center distance between the roll pairs 16, 16 and 17, 17, respectively.

The large diameter first disc 2L has to be transported between the loading or eject position and the reproducing or recording position, in a direction indicated by arrow F in FIG. 7, and across the reproducing or recording position and the housing position in a direction indicated by arrow F in FIG. 7, so that the relationship [D1>L] holds.

On the other hand, the small diameter second disc 2S, transported between the loading or eject position and the reproducing or recording position, in a direction indicated by arrow F in FIG. 7, is inhibited from being transported between the reproducing or recording position and the housing position, so that, if the diameters of the rolls 16, 17 are discounted, the relationship [D2<L] holds. That is, when an area of the outer rim of the second disc 2S is clamped by the roll pair 16,16, a diametrically opposite area of the roll pair 16, 16 does not get to the other roll pair 17, 17. Thus, even if the second disc 2S is transported to the maximum extent by the roll pair 16, 16 in the direction indicated by arrow F in FIG. 7, the outer rim of the second disc 2S is unable to reach the other roll pair 17, 17 disposed towards the housing section 3. Consequently, even if the other roll pair 17, 17 are rotated about the center axes thereof as center of rotation, the second disc 2S cannot be transported to the housing position, with the other roll pair 17, 17 simply performing idling rotation. In actuality, the diameters of the paired rolls 16, 17 cannot be discounted, so that, taking this into account, the diameter D2 of the second disc 2S is set so as to be smaller than the distance L less the diameters of the rolls 16 and 17. That is, the rule of thumb is that, under the state in which the second disc 2S has been transported to the maximum extent in the direction indicated by arrow F in FIG. 7, the second disc 2S does not reach the other roll pair 17, 17.

Figure 8:
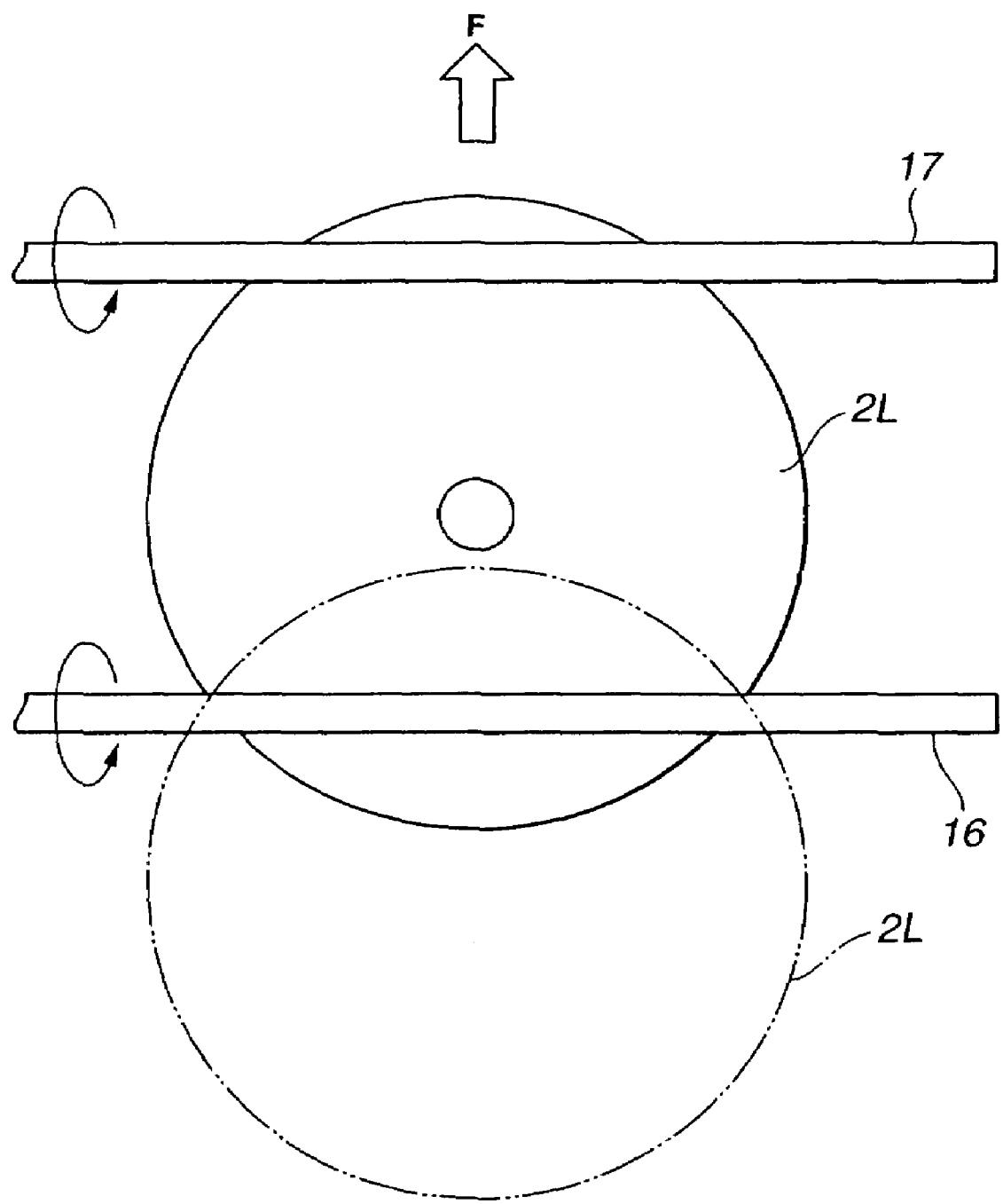
FIG. 8 is a plan view showing the state of transporting the first disc of a larger diameter to a recording and/or reproducing position.
Figure 9:
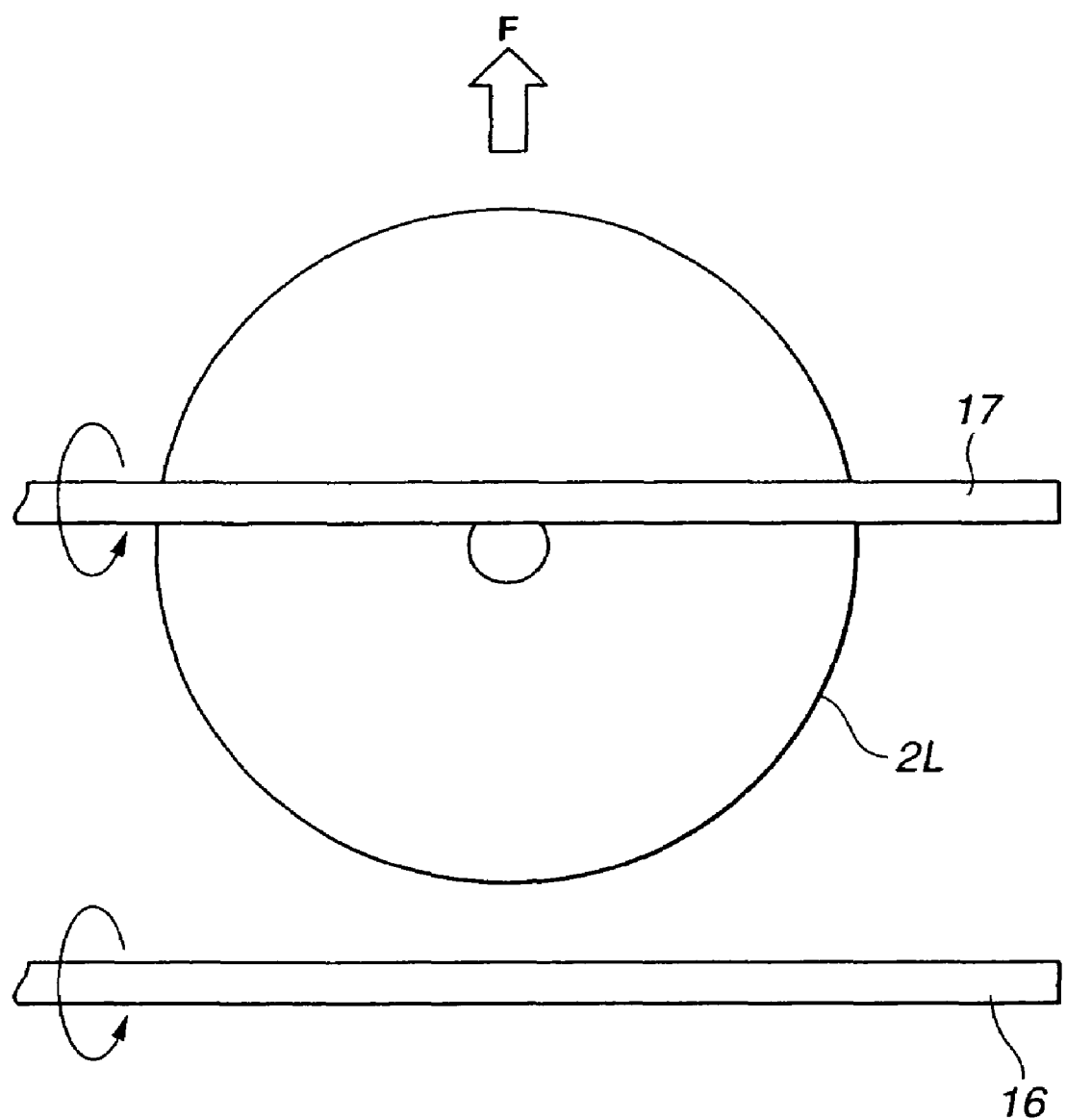
FIG. 9 is a plan view showing the state of transporting the first disc of a larger diameter to a housing position.

FIGS. 8 and 9 schematically show the state in which the first disc 2L is being transported. Specifically, FIG. 8 shows the first disc 2L being transported from the loading or eject position to the reproducing or recording position, and FIG. 9 shows the first disc 2L being transported from the reproducing or recording position towards the housing position. In these figures, the direction of arrow F coincides with that of FIG. 7.

As for the large diameter disc, that is the first disc 2L, the outer rim area of the first disc 2L towards the arrowhead of arrow F in FIG. 8 gets to the roll pair 17, 17 before the first disc 2L has traversed the distance by which the disc 2L may be transported under the rotational driving power of the roll pair 16, 16, that is the marginal transport distance, so that the disc 2L may be transported to the housing position by the rotation of these rolls 17, 17. Stated differently, the first disc 2L can be transported by the roll pairs 16, 16 and 17, 17 between the loading or eject position and the reproducing or recording position of the housing position.

Figure 10:
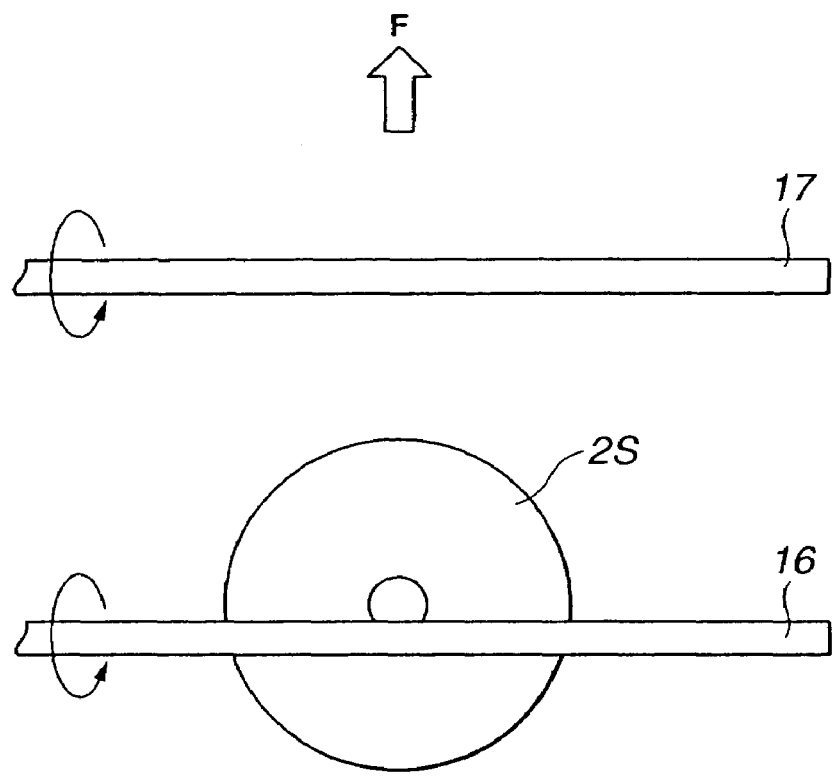
FIG. 10 is a plan view showing the state of transporting the second disc smaller in diameter than the first disc to a recording and/or reproducing position.
Figure 11:
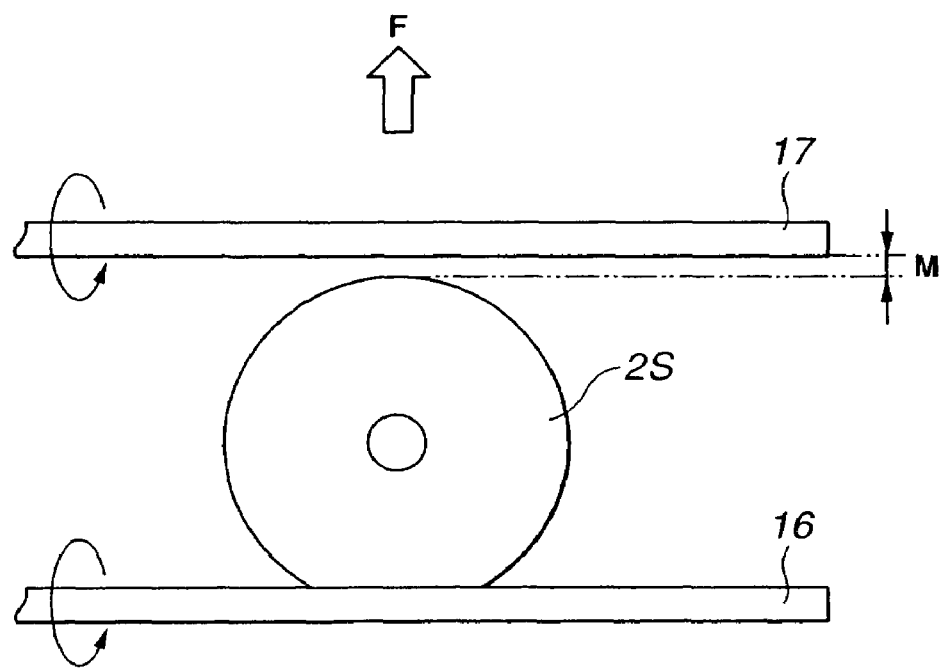
FIG. 11 is a plan view showing the state in which limitations have been imposed on movement of the second disc from the recording and/or reproducing position to the housing section.

FIGS. 10 and 11 schematically show the second disc 2S being transported. Specifically, FIG. 10 shows the second disc 2S being transported from the loading or eject position to the reproducing or recording position, and FIG. 11 shows the second disc 2S not transported from the reproducing or recording position towards the housing position. In these figures, the direction of arrow F coincides with that of FIG. 7.

As for the small diameter disc, that is the second disc 2S, the outer rim area of the second disc 2S towards the arrowhead of arrow F in FIG. 10 does not get to the roll pair 17, 17 even if the second disc 2S has traversed the distance by which the disc 2S may be transported under the rotational driving power of the roll pair 16, 16, that is the marginal transport distance. That is, a gap M indicated by arrows is produced between the second disc 2S and the other roll pair 17, 17, thus disabling the feed operation by the roll pair 17, 17 next following the feed operation by the roll pair 16, 16. The result is that the second disc 2S smaller in diameter than the first disc 2L may be prohibited from being inadvertently fed to the housing position.

In the present configuration, the front and reverse sides of the disc-shaped recording medium 2, that is the first disc 2L and the second disc 2S, are clamped by the two roll pairs, so that it is only sufficient to provide two roll pairs at a preset spacing from each other, while it is unnecessary to physically shift the transport mechanism depending on the diameter of the disc being transported, thus simplifying the mechanical structure. Although a variety of different structures may be used, such as transport or guide rolls added for transporting the small sized disc-shaped recording medium, it is more desirable, from the perspective of reducing the cost or the number of components, that the configuration be made up by the minimum number of components necessary for transport.

FIGS. 12 to 16 show the implementation of the configuration (II) described above. In these figures, the meanings of arrows E and F are the same as those in FIGS. 7 to 11, while the meanings of [D1] and [D2] are the same as those in FIG. 7.

In the present embodiment, plural rotational rolls are used, with the lateral sides thereof being the contact portions with the outer peripheral end face of the disc-shaped recording medium. The first disc 2L and the second disc 2S are transported as the rotational rolls clamp the discs 2L, 2S. This transport apparatus includes a plural number of rolls, that is rolls 21a, 21b, 22a, 22b, rotated about axes of rotation perpendicular to the drawing sheet of FIG. 12. The rolls 21a, 21b are paired together to form the roll pair 21, while the rolls 22a, 22b are paired together to form the roll pair 22. The distances between these rotational rolls 21a, 21b and the rotational rolls 22a, 22b may be changed by a movement control mechanism, not shown. That is, the rotational rolls 21a, 21b, 22a, 22b are movable along elongated guide openings 23a, 23b, 23c, 23d, respectively. The extent of possible movement is indicated by [H] in the drawing. As for the movement control mechanism, such a configuration including a driving mechanism for varying the distance between paired rotational rolls and a feed mechanism, or including an elastic member, such as a coil spring, for perpetually biasing the paired rotational rolls towards or away from each other, may be used, provided that the power counteracting the biasing power is applied for varying the spacing between the rotational rolls. The specified structure of the configuration used is not relevant to the present invention and hence is not explained herein in detail.

Since the roll pair 22 is located towards the arrowhead of the arrow F, corresponding to the direction of the housing section 3 for the disc-shaped recording medium, and the roll pair 21 is located towards the arrowhead of the arrow E, corresponding to the direction of ejecting the disc-shaped recording medium, the roll pairs 22, 21 make up the second transporting mechanism 9b and the first transporting mechanism 9a, respectively. It is noted that the driving power from a common driving power source is supplied through a motion transmitting mechanism, not shown, to the roll pairs 21, 22. Of the rotational rolls 21a, 21b, 22a, 22b, those arranged on the left side of the disc-shaped recording medium in FIGS. 12 to 16, that is rotational rolls 21a, 22a, are driving rolls, with the rotational rolls disposed on the right side of the disc-shaped recording medium in the drawing, that is rotational rolls 21b, 22b, are follower rolls.

The large diameter discs, that is the first disc 2, has to be transported in the direction indicated by arrow F in the drawing between the loading or eject position and the reproducing or recording position and between the reproducing or recording position and the housing position. Consequently, the diameter D1 of the first disc 2L is set so as to be longer than the distance between the roll pairs 21, 22, as shown in FIG. 12, such that, by moving the rotational rolls 21a, 21b, 22a, 22b in their entirety towards the first disc 2L, that is in a direction approaching to the first disc 2L, the rolls can be abutted against the outer rim of the first disc 2L.

Figure 12:
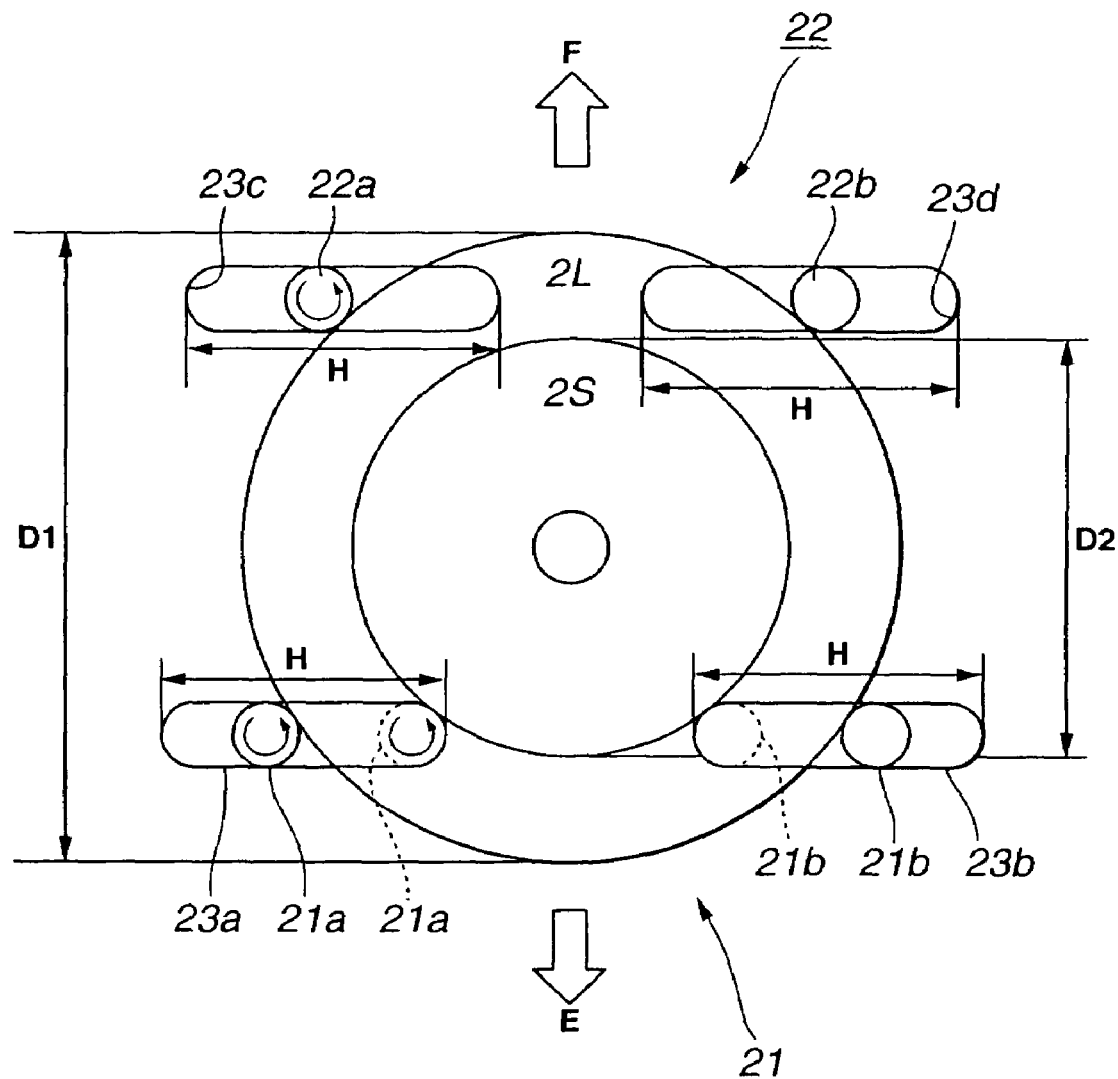
FIG. 12 is a plan view showing a transporting mechanism employing movable rotational rolls and specifically showing the position relationships between first and second discs of different diameters and two roll pairs.

Conversely, as for the second disc 2S which is smaller in diameter than the first disc 2L, the position relationships of the roll pairs 21, 22 are set so that the second disc 2S can be transported in the direction indicated by arrow F in FIG. 12 between the loading or eject position and the reproducing or recording position, by narrowing the distance between the rotational rolls 21a and 21b of the roll pair 21, however, the transport of the second disc 2S between the reproducing or recording position and the housing position is inhibited. That is, when the end of the second disc 2S towards its outer rim is clamped by the roll pair 21, the opposite side of the second disc 2S, that is the end thereof in the direction indicated by arrow F in FIG. 12, does not reach the roll pair 22. Consequently, even if the second disc 2S is transported to the maximum extent by the roll pair 21 in the direction indicated by arrow F in FIG. 12, the outer rim of the second disc 2S does not reach the roll pair 22. Thus, even if the rotational rolls 22a, 22b making up the roll pair 22 are caused to approach to each other by movement along the elongated guide openings 23c, 23d, as the rolls 22a, 22b are rotated about the axes of rotation as the center of rotation, the small diameter second disc 2S is not transported to the housing section, with the rolls 22a, 22b merely rotating in idleness.

Figure 13:
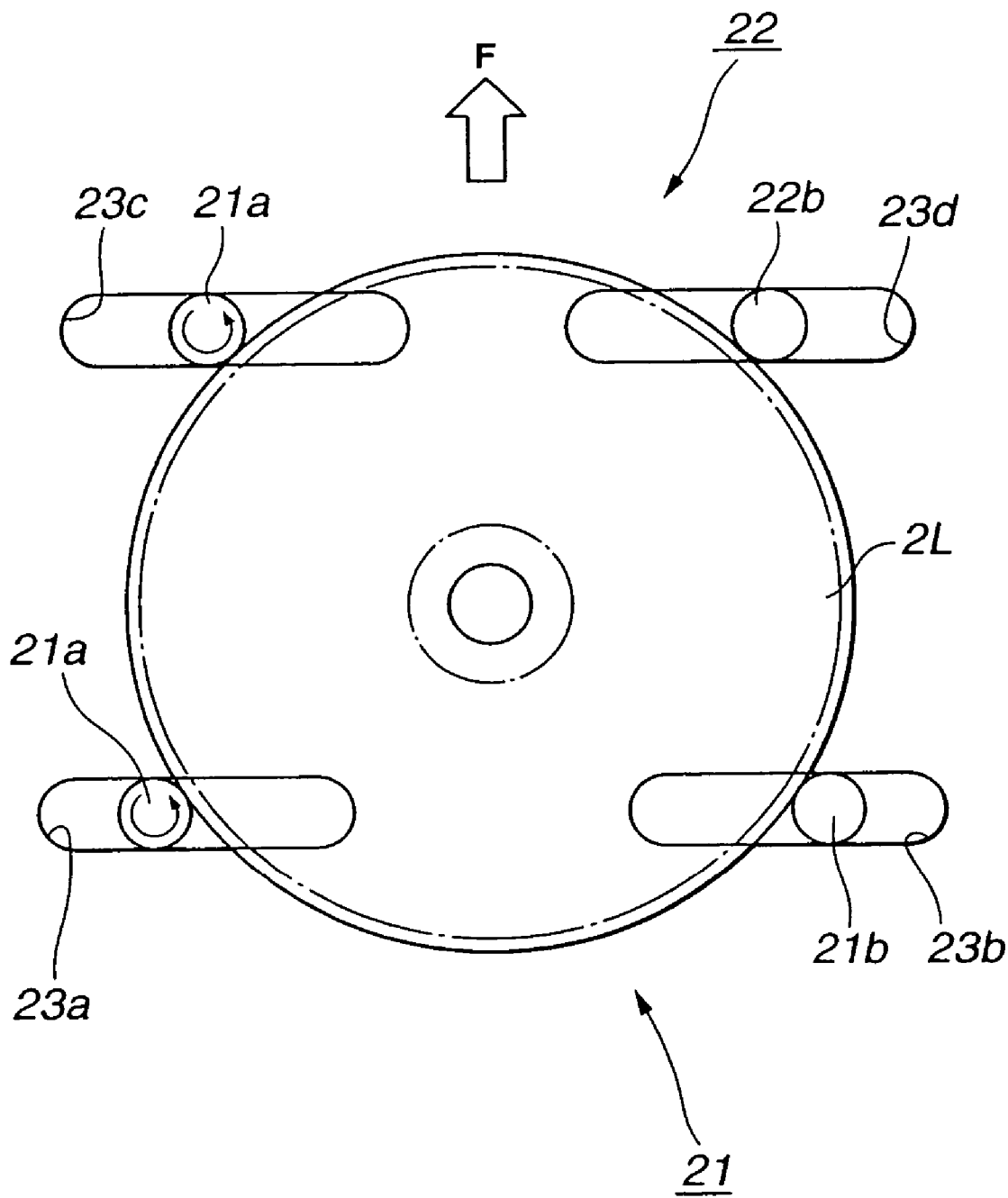
FIG. 13 is a plan view showing the state of transporting the first disc of a larger diameter to a recording and/or reproducing position.
Figure 14:
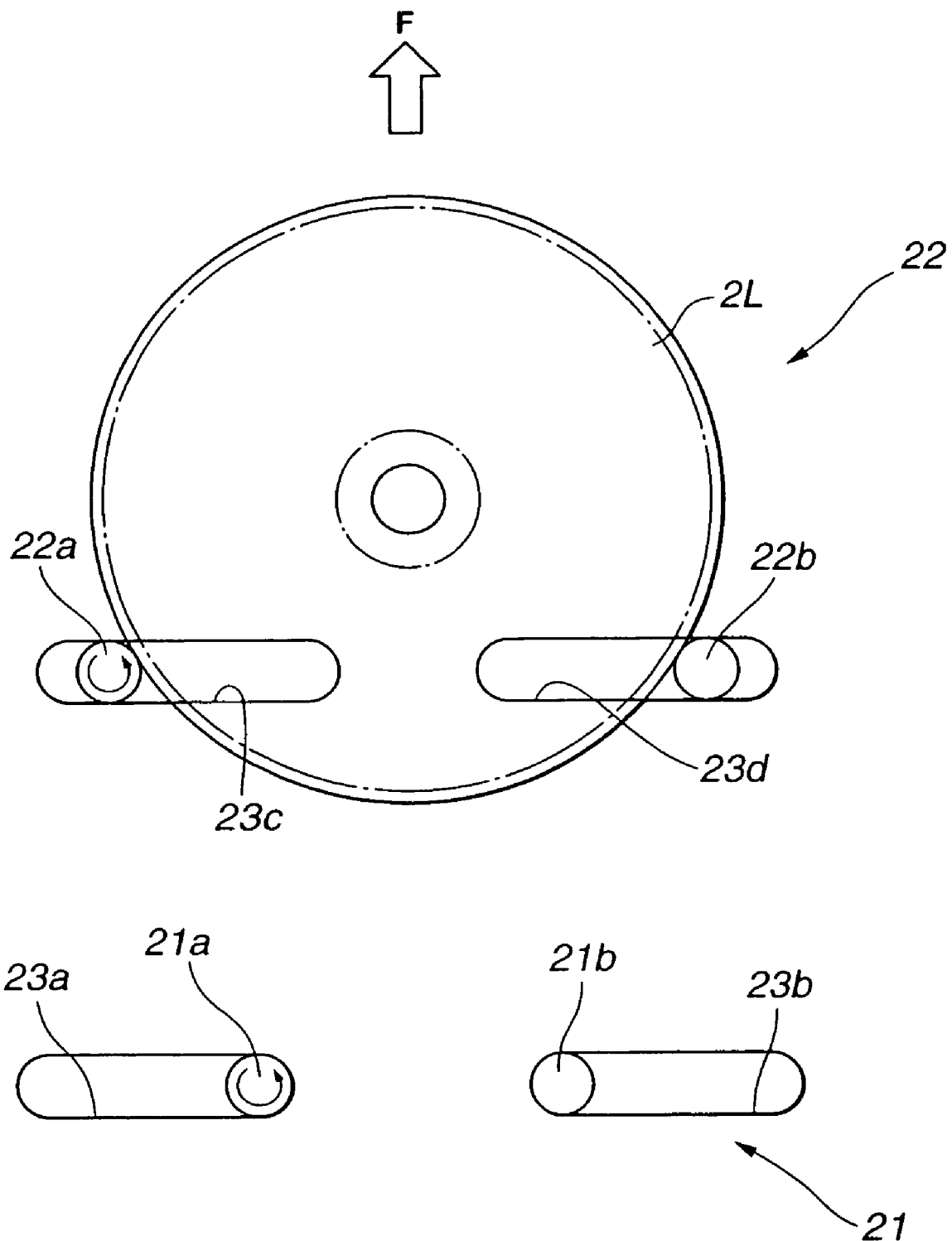
FIG. 14 is a plan view showing the state of transporting the first disc of a larger diameter to a housing position.

FIGS. 13 and 14 schematically show the first disc 2L being transported. FIG. 13 shows the state in which the first disc 2L is transported in the direction indicated by arrow F in the drawing from the loading or eject position to the reproducing or recording position by the rotational rolls 21a and 21b contacted with the end faces of the outer rim of the first disc 2L. FIG. 14 shows the state in which the first disc 2L is transported in the direction indicated by arrow F in the drawing from the reproducing or recording position to the loading position by the roll pair 22.

As for the large diameter disc, that is the first disc 2L, the outer rim of the first disc 2L in the direction indicated by arrow F in FIG. 14 reaches the roll pair 22 before the first disc 2L has traversed the marginal transport distance for which the disc can be fed in the direction indicated by arrow F in FIGS. 13 and 14 under the rotational driving power of the roll pair 21. Thus, the first disc 2L is transported in the direction indicated by arrow F to the housing position under the rotational driving power of the roll pair 22.

Figure 15:
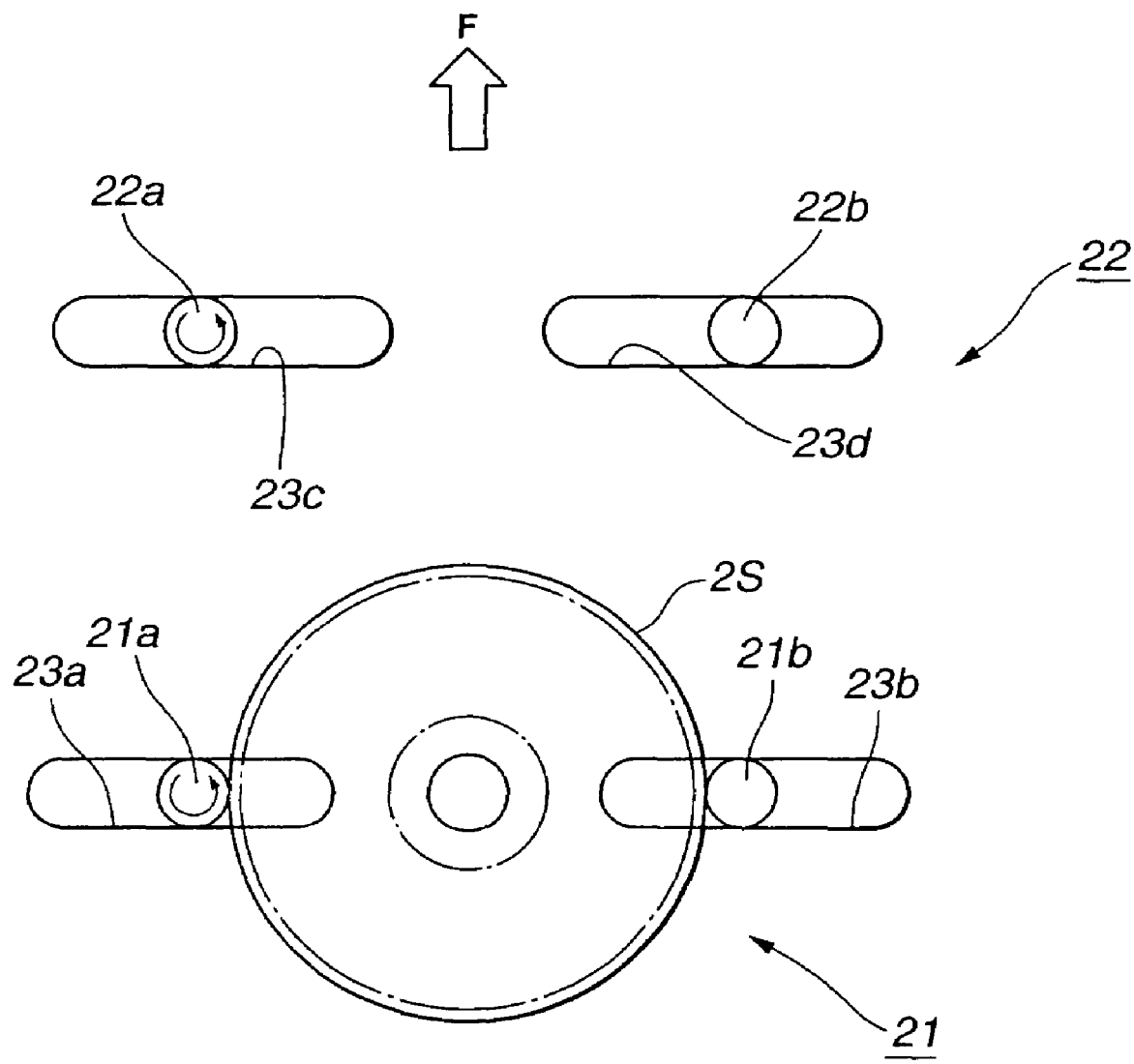
FIG. 15 is a plan view showing the state of transporting the second disc smaller in diameter than the first disc to a recording and/or reproducing position.
Figure 16:
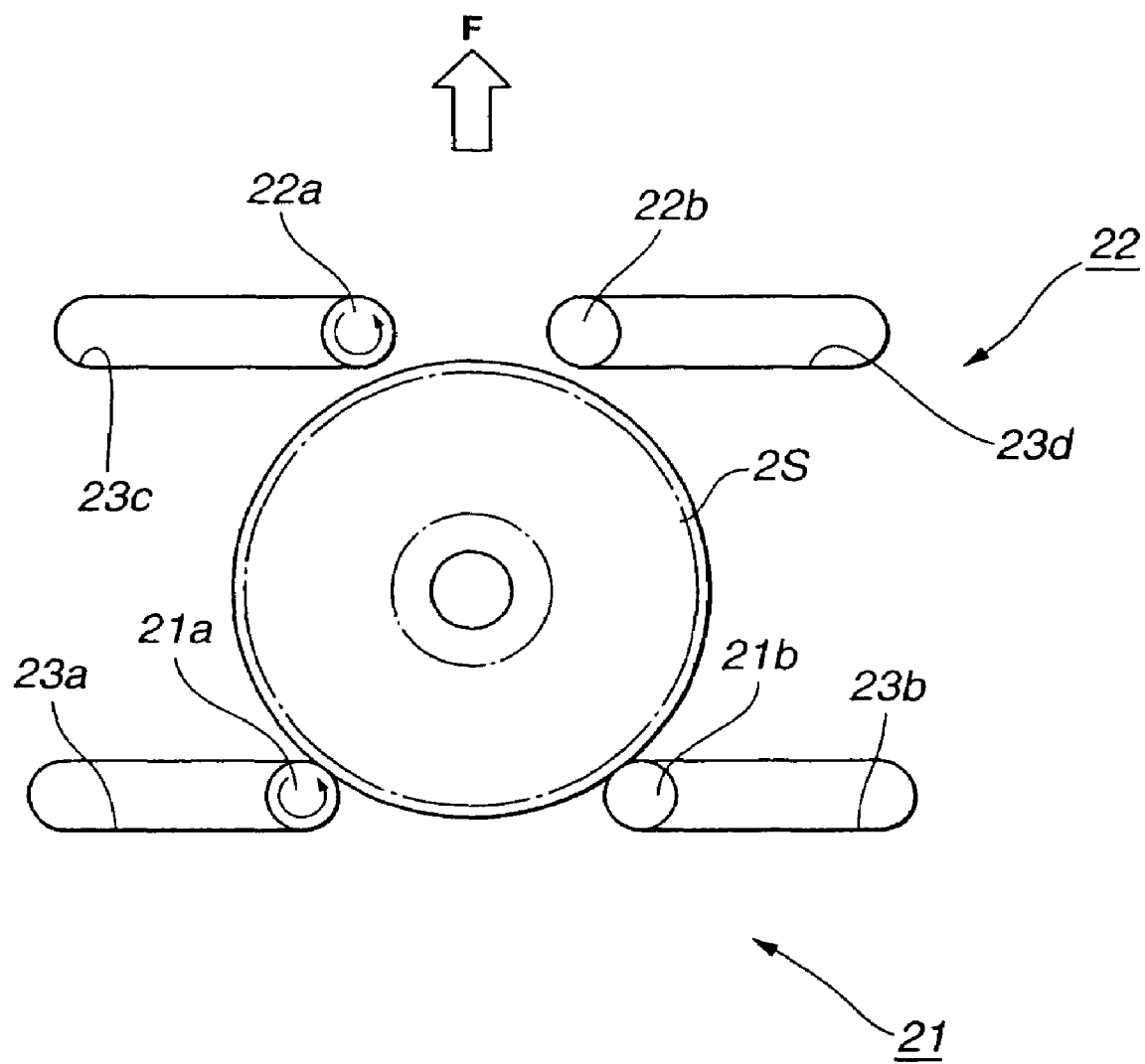
FIG. 16 is a plan view showing the state in which limitations have been imposed on movement of the second disc from the recording and/or reproducing position to the housing section.

FIGS. 15 and 16 schematically show the manner of transport of the second disc 2S. Specifically, FIG. 15 shows the disc being transported from the loading or eject position to the reproducing or recording position, while FIG. 16 shows that it is impossible to transport the disc from the reproducing or recording position to the housing position.

In the case of the small-sized disc, that is the second disc 2S, the outer rim of the second disc 2S does not reach the roll pair 22, as shown in FIG. 16, even if the second disc 2S has traversed the marginal transport distance for which the disc can be transported in the direction indicated by arrow F in FIG. 15 under the rotational driving power of the roll pair 21, so that it is possible to prevent the second disc 2S from being inadvertently transported to the housing position.

The present configuration has an advantage that, since the disc-shaped recording medium 2 has to be transported by clamping the outer rim of the disc-shaped recording medium 2 from the lateral side by the roll pairs 21, 22, movement control is needed for varying the distance between the rotational rolls 21a, 21b, 22a, 22b of the roll pairs 21, 22, however, the transport direction of the disc-shaped recording medium 2 can be specified to high accuracy.

The aforementioned configuration (III) is now explained with reference to FIGS. 17 to 21.

The meanings of the arrows E and F in FIGS. 17 to 21 are the same as those of FIGS. 7 to 11, while the meanings of the arrows [D1] and [D2] are as explained in connection with FIG. 7.

In the present embodiment, the transport belts and roll pairs thereof, as contact portions with the outer peripheral end face of the disc-shaped recording medium 2, are movable between a state of clamping the first disc 2L in-between, and a state of clamping the second disc 2S in-between.

Specifically, the present configuration includes a first transport unit 28a, composed of a driving unit 26 and a guide unit 27 paired to the driving unit 26. The driving unit 26 is made up by a pair of rolls 24a, 24b, rotated about a rotational axis perpendicular to the drawing sheet, and a belt member 25a placed across the rolls 24a, 24b. Similarly to the driving unit 26, the guide unit 27 is made up by a pair of follower rolls 24c, 24d and a belt member 25b placed across the rolls 24c, 24d.

The present configuration similarly includes a second transport unit 28b, composed of a driving unit 31 and a guide unit 32 paired to the driving unit 31. The driving unit 31 is made up by a pair of rolls 29a, 29b, rotated about rotational axes perpendicular to the drawing sheet, and a belt member 30a placed across the rolls 29a, 29b. Similarly to the driving unit 31, the guide unit 32 is made up by a pair of follower rolls 29c, 29d and a belt member 30b placed across the rolls 29c, 29d.

With the first transport unit 28a, the spacing between the driving unit 26 and the guide unit 27 can be changed by a movement control mechanism, not shown. That is, since the driving unit 26 and the guide unit 27 are movable along elongated guide openings 33a, 33b; 33c, 33d, the spacing between the driving unit 26 and the guide unit 27 can be adjusted into keeping with the diameter of the disc-shaped recording medium. Meanwhile, the movement control mechanism may be of configuration of positively providing a driving mechanism or a feed mechanism for changing the distance between the driving unit 26 and the guide unit 27, or of a configuration of biasing the driving unit 26 and the guide unit 27 at all times in a direction towards or away from each other, using an elastic member, such as a coil spring, and applying a force counteracting the biasing force for changing the distance therebetween. The specified configuration used is not relevant to the present invention and hence is not explained in detail herein.

The second transport unit 28b is not provided with a mechanism for varying the separation between the driving unit 31 and the guide unit 32. This separation between the units 31, 32 is set or adjusted to a length or separation corresponding to the diameter D1 of the first disc 2L. That is, the spacing between the driving unit 31 and the guide unit 32 is set to a magnitude slightly narrower than the first disc 2L in order to clamp the first disc 2L.

Figure 17:
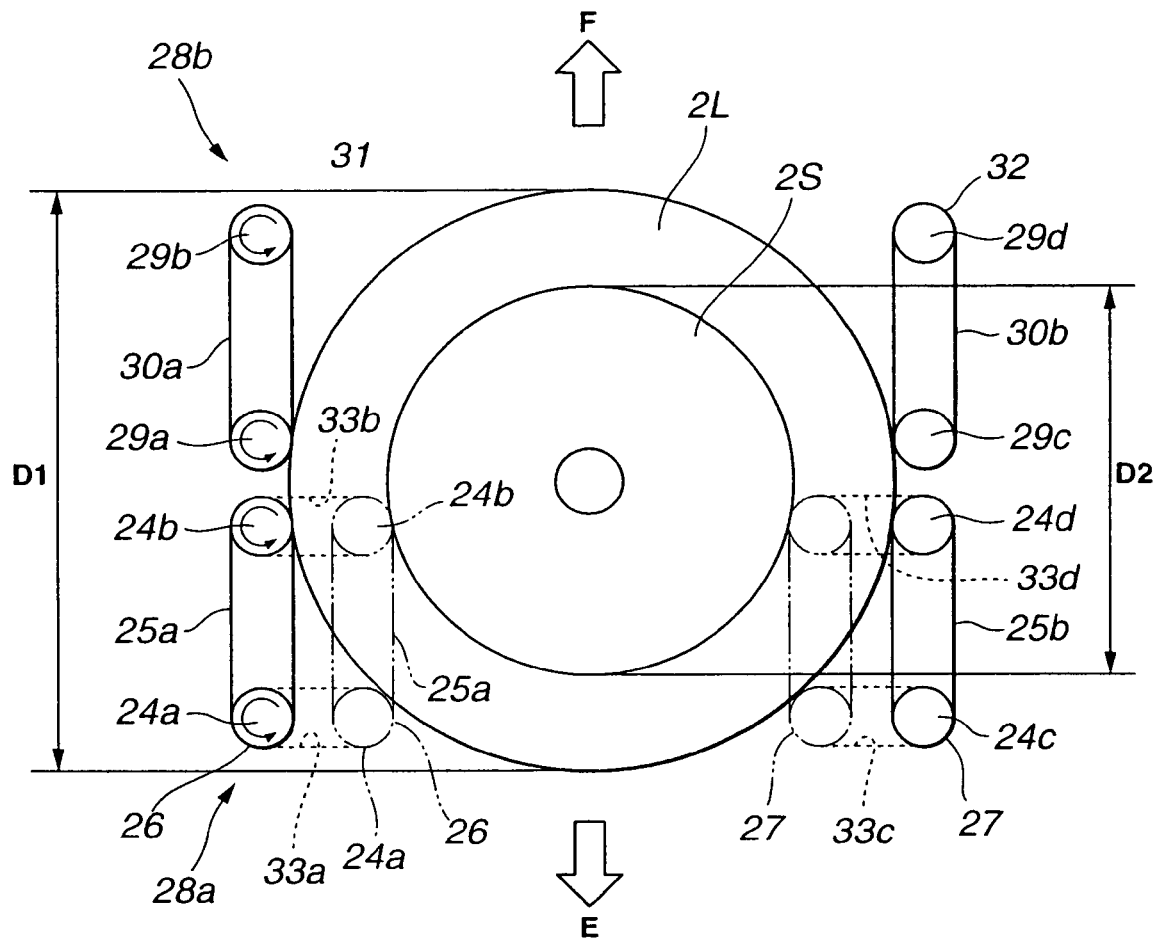
FIG. 17 is a plan view showing a transporting mechanism employing rotational rolls and belts and specifically showing the position relationships between the first and second discs of different diameters on one hand and a driving unit and a guide unit on the other hand.

Referring to FIG. 17, the second transport unit 28b is positioned towards the housing direction for the disc-shaped recording medium 2, corresponding to the direction of the arrow F, while the first transport unit 28a is positioned towards the arrow E direction corresponding to the ejecting direction of the disc-shaped recording medium 2, so that the second transport unit 28b and the first transport unit 28a make up the second transporting mechanism 9b and the first transporting mechanism 9a, respectively. Meanwhile, the driving units 26, 31 are supplied with the driving power from the common driving power source through a motion transmission mechanism, not shown.

The first disc 2L needs to be transported across the loading or ejection position and the recording and/or reproducing position, in the direction indicated by arrow F, and across the recording and/or reproducing position and the housing position, in the direction indicated by arrow F. To this end, the driving unit 26 and the guide unit 27 in the first transport unit 28a are moved along the elongated openings 33a to 33d so that the separation between the driving unit 26 and the guide unit 27 corresponds to the diameter D1 of the first disc 2L in order that the disc-shaped recording medium is transported in the direction indicated by arrow F up to the recording and/or reproducing position as the outer rim of the first disc 2L is clamped from the lateral side by the first transport unit 28a. In the second transport unit 28b, the separation between the driving unit 31 and the guide unit 32 is set so as to correspond to the diameter D1 of the first disc 2L, such that the first disc 2L may be transported towards the housing position, by clamping the outer rim of the first disc 2L by the driving unit 31 and the guide unit 32 from the lateral side, as the driving unit 31 guide unit 32 are abutted against the outer rim of the first disc 2L.

As for the second disc 2S, the position relationships between the first transport unit 28a and the second transport unit 28b are set in such a manner that, although the second disc 2S can be transported by the first transport unit 28a across the loading or eject position and the recording and/or reproducing position in the direction indicated by arrow F by reducing the separation between the driving unit 26 and the guide unit 27, by a movement control mechanism, not shown, the transport of the second disc between the reproducing or recording position and the housing position is inhibited. That is, even if the second disc 2S is transported by the first transport unit 28a to the maximum extent in the direction indicated by arrow F in the drawing, the outer rim of the second disc 2S in the direction indicated by arrow F in the drawing does not get to the second transport unit 28b and hence the second disc 2S does not reach the housing position.

Figure 18:
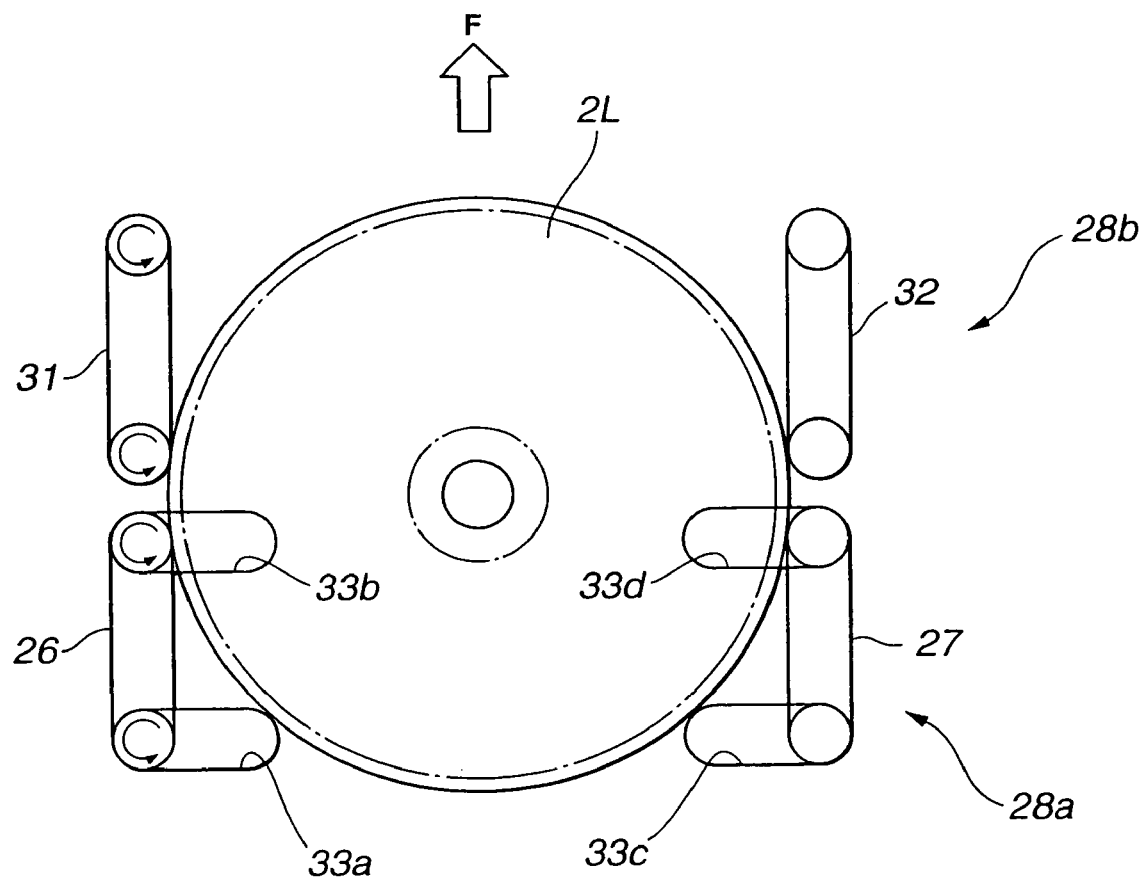
FIG. 18 is a plan view showing the state of transporting the first disc of a larger diameter to a recording and/or reproducing position.
Figure 19:
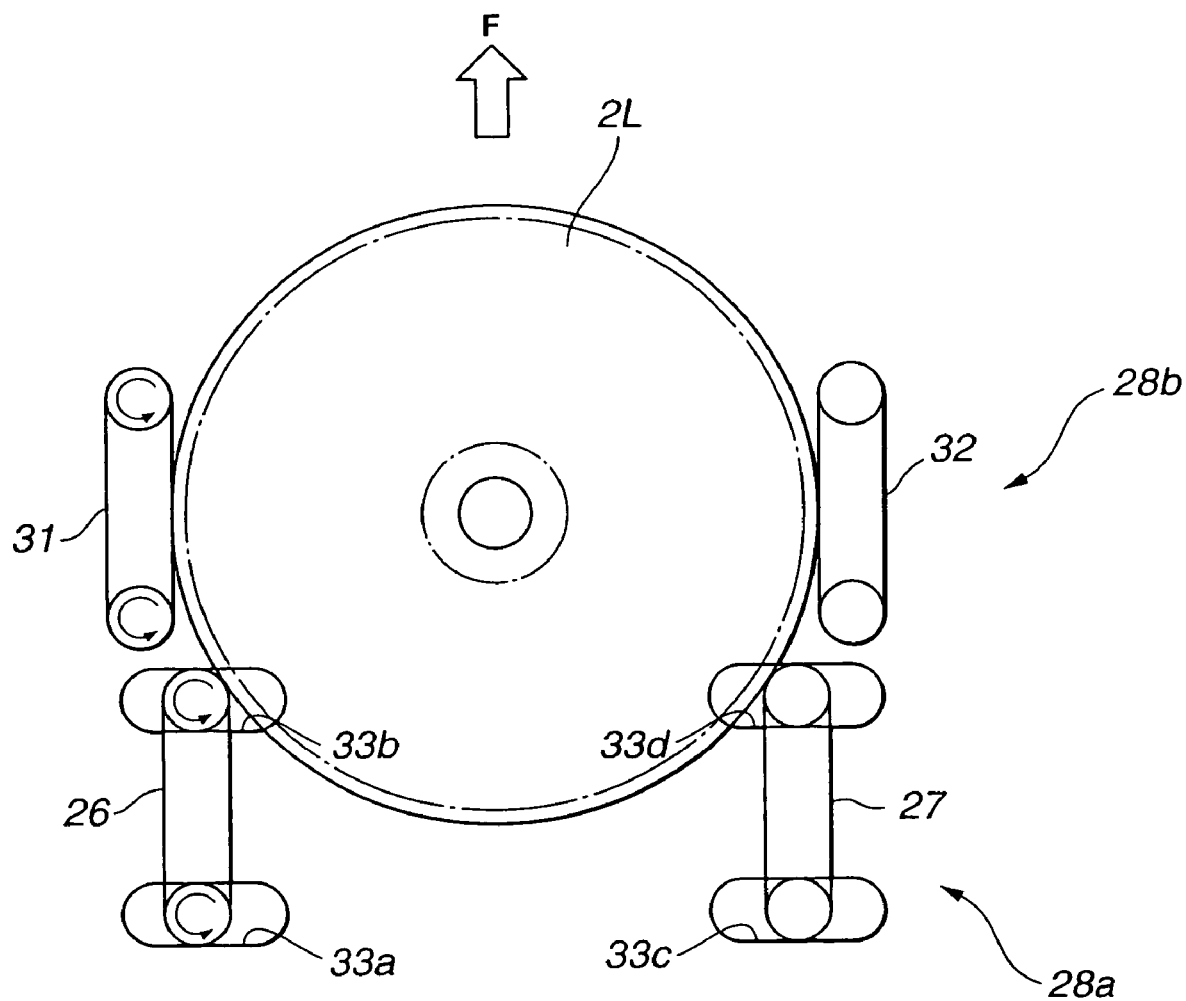
FIG. 19 is a plan view showing the state of transporting the first disc of a larger diameter to a housing position.

FIGS. 18 and 19 show the state of transport of the first disc 2L. Specifically, FIG. 18 shows that the first disc 2L has been transported from the loading or eject position to the reproducing or recording position by belt members 25a, 25b of the first transport unit 28a contacted with the outer rim of the first disc 2L, and FIG. 19 shows the first disc 2L being transported by the second transport unit 28b from the reproducing or recording position to the housing position.

In the case of the large diameter disc, that is the first disc 2L, the outer rim of the first disc 2L in the direction indicated by arrow F in the drawing reaches the second transport unit 28b when or before the first disc 2L has traversed the marginal transport distance for which the first disc 2L can be transported by the rotational driving power of the first transport unit 28a in the direction indicated by arrow F in the drawing. Thus, the first disc 2L can be transported in the direction indicated by arrow F in the drawing up to the housing position under the driving power of the belt member 30a of the driving unit 31 and the belt member 30b of the guide unit 32.

Figure 20:
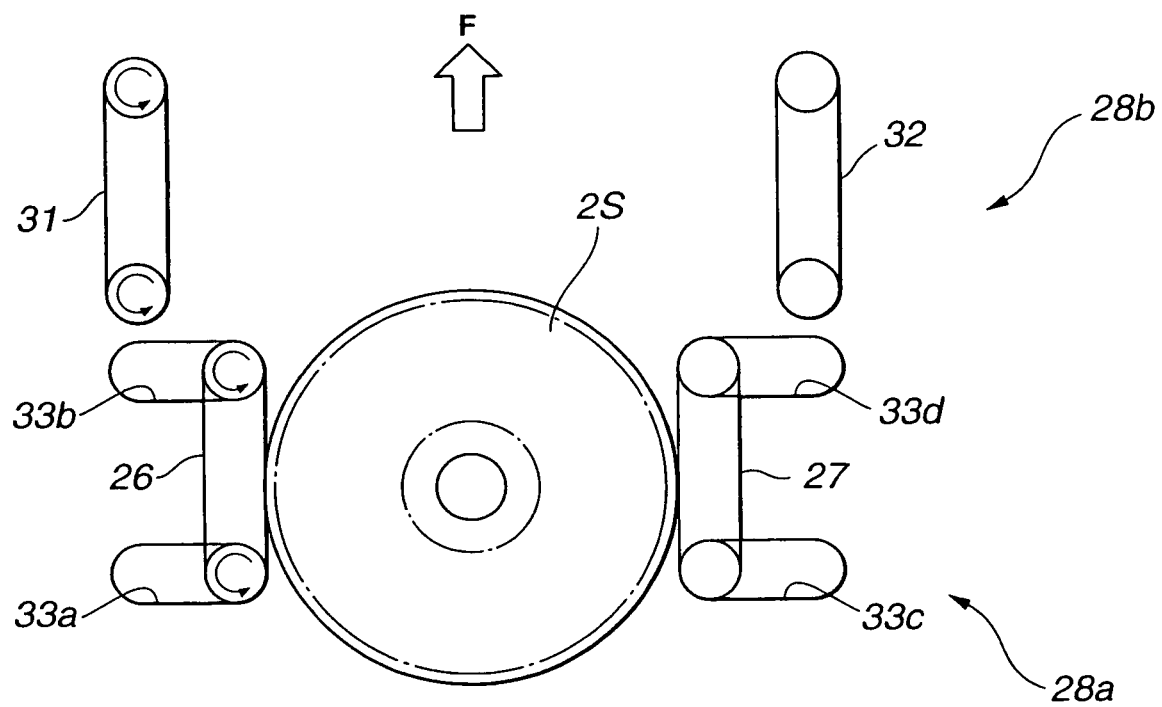
FIG. 20 is a plan view showing the state of transporting the second disc smaller in diameter than the first disc to a recording and/or reproducing position.
Figure 21:
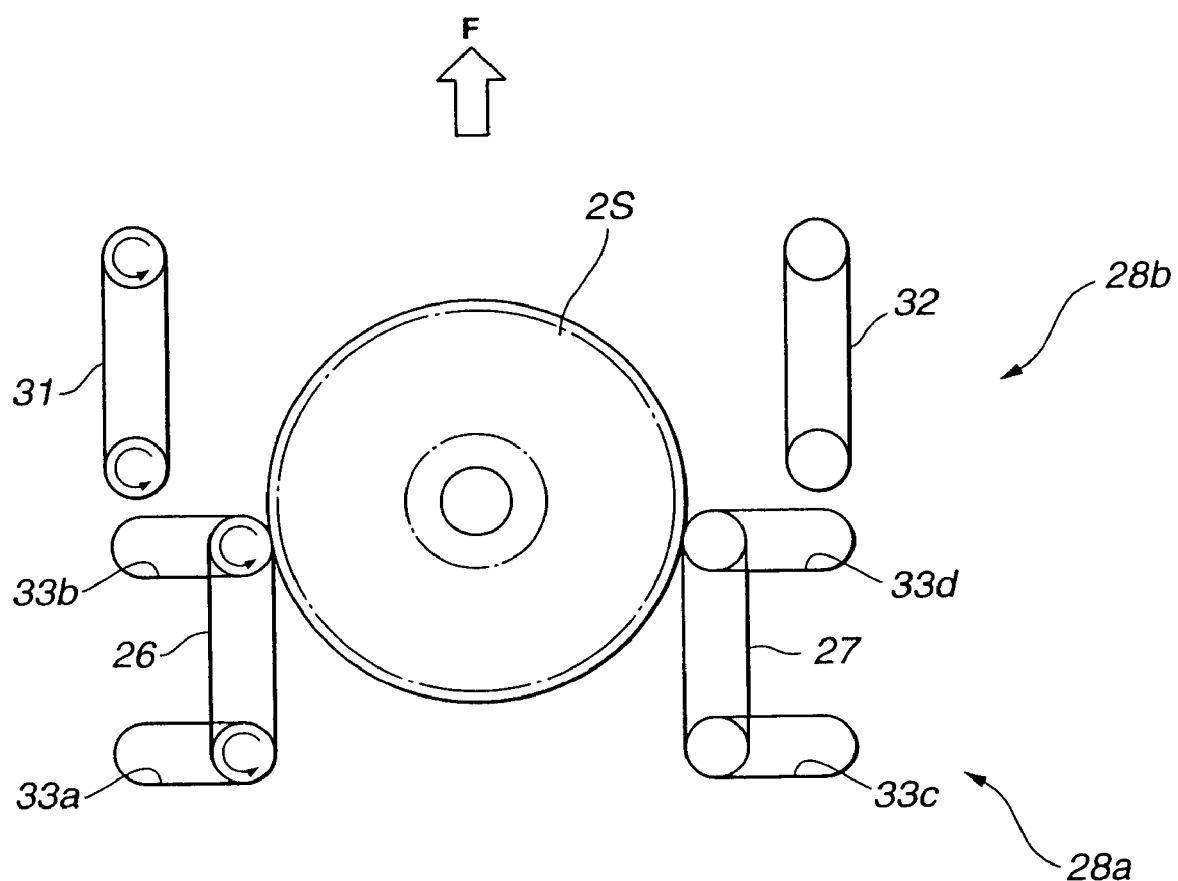
FIG. 21 is a plan view showing the state of transporting the second disc of a smaller diameter to a housing position.

FIGS. 20 and 21 schematically show the state of transport of the second disc 2S. Specifically, FIG. 20 shows the second disc 2S being transported in the direction indicated by arrow F in the drawing from the loading or eject position towards the reproducing or recording position, and FIG. 21 shows the state in which the second disc 2S cannot be transported from the reproducing or recording position towards the housing position, even if it is tried to do so.

In the case of the small-sized disc, that is the second disc 2S, the outer rim of the second disc 2S in the direction indicated by arrow F in the drawing has not reached the second transport unit 28b when the second disc 2S has traversed the marginal transport distance for which the second disc 2S can be transported by the rotational driving power of the first transport unit 28a in the direction indicated by arrow F in the drawing. Consequently, the second disc 2S is not inadvertently transported to the housing section.

In the present configuration, in which the disc-shaped recording medium has to be transported as its outer rim is clamped by the transport units 28a, 28b, it is necessary to perform transport movement control for varying the distance between the driving unit 26 and the guide unit 27 in the first transport unit 28a. However, the present configuration has a merit that the transport direction of the disc-shaped recording medium can be determined accurately.

Figure 22:
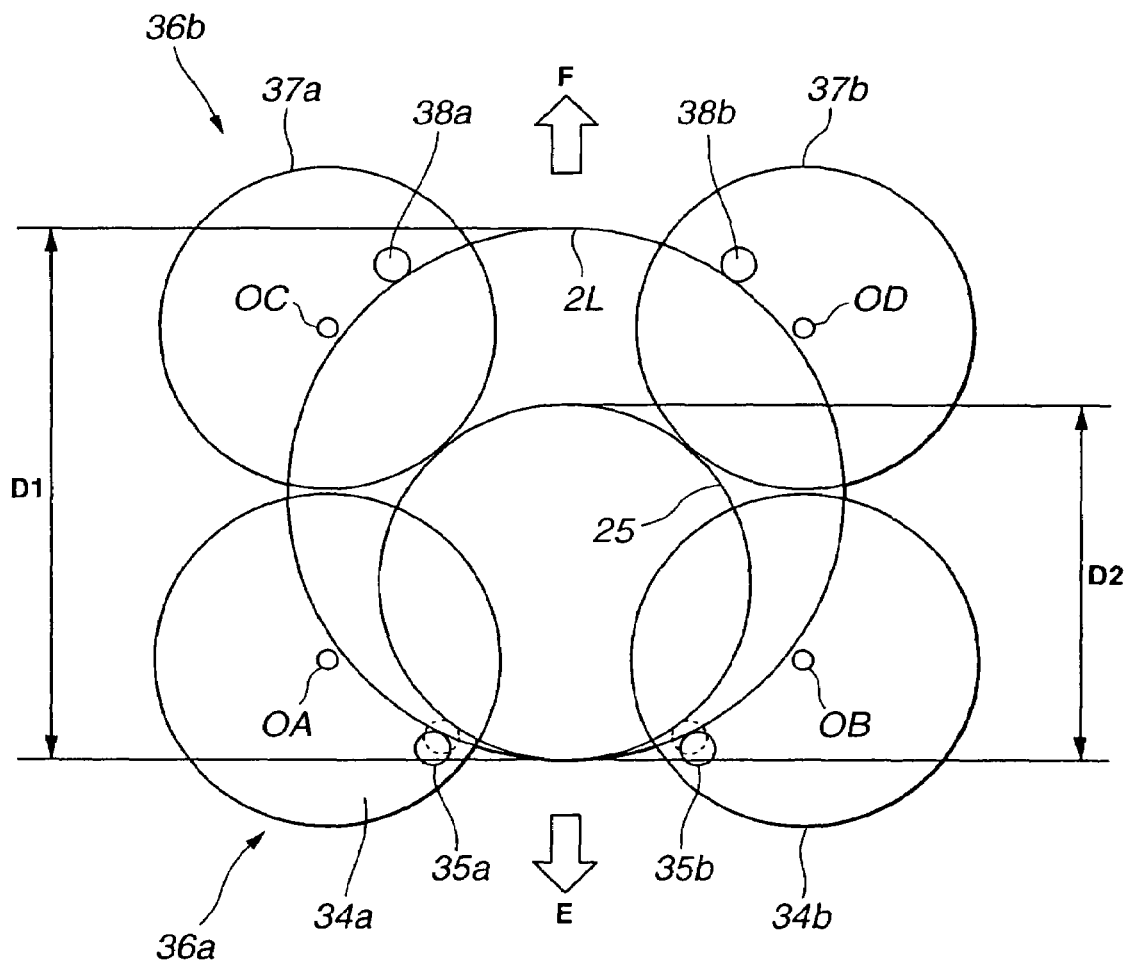
FIG. 22 is a plan view showing a transporting mechanism employing a rotational member having a feed unit and specifically showing the position relationships between the first and second discs of different diameters on one hand and the driving unit and the guide unit on the other hand.

FIGS. 22 to 26 show the aforementioned configuration (IV). The meanings of the arrows E and F in these figures are the same as those of FIGS. 7 to 11, while the meanings of the arrows [D1] and [D2] in FIG. 22 are as explained in connection with FIG. 7.

In the present embodiment, plural rotational members are used, and the feed section provided to each rotational member serves as a contact portion with an end face towards the outer rim of the disc-shaped recording medium, with each feed section being rotated as it clamps the first disc 2L or the second disc 2S. That is, plural rotational members, rotated about the rotational axes perpendicular to the drawing sheet, e.g., rotational wheels, are used. However, in the present embodiment, the feed sections provided to the respective rotational members are abutted against the outer rim of the disc-shaped recording medium, instead of arranging plural rotational rolls in contact with the outer peripheral end face of the disc-shaped recording medium for transport, as in the configuration (II) explained in connection with FIGS. 12 to 16.

Specifically, feed sections 35a, 35b, made up by feed pins and feed rolls, are arranged at the locations spaced a preset distance from rotational centers OA, OB of two disc-shaped rotational members 34a, 34b, respectively. The rotational members 34a, 34b, as a set, constitute a first transport unit 36a.

In similar manner, feed sections 38a, 38b are set upright on two disc-shaped rotational members 37am 37b at the positions spaced a preset distance from the rotational centers OC and OD which is smaller than the distance between the feed sections 35a, 37b and the rotational centers of the rotational members 34a, 34b. The rotational members 37a, 37b, as a set, constitute a second transport unit 36b.

In the present embodiment, as shown in FIG. 22 to FIG. 26, the second transport unit 36b is positioned towards the direction of the arrow F which is the housing direction for the disc-shaped recording medium, while the first transport unit 36a is positioned towards the direction of the arrow E which is the ejecting direction for the disc-shaped recording medium. Thus, the second transport unit 36b constitutes the second transporting mechanism 9b, while the first transport unit 36a constitutes the first transporting mechanism 9a. The rotational members 34a, 34b, 37a and 37b are supplied with the driving power from a common driving power source via a motion transmission mechanism, not shown.

The large diameter first disc 2L has to be transported in the direction indicated by arrow F in the drawing, between the loading or eject position and the reproducing or recording position, while it has to be be transported in the direction indicated by arrow F in the drawing, between the reproducing or recording position and the housing position. Thus, the rotational members 34a, 34b are rotated in opposite directions to transport the first disc 2L to the reproducing or recording position, as the outer rim of the first disc 2L is clamped from the lateral side by the feed sections 35a, 35b of the rotational members 34a, 34b. As for the first disc 2L in the reproducing or recording position, the rotational members 38a, 38b of the rotational members 37a, 37b are rotated in opposite directions to transport the first disc 2L to the housing position, in the direction indicated by arrow F in the drawing, as the outer rim of the first disc 2L is clamped from the lateral side by the feed sections 38a, 38b.

As for the second disc 2S, the position relationships of the transport units 36a, 36b are set so that, while the second disc 2S may be transported in the direction indicated by arrow F in the drawing between the loading or eject position and the reproducing or recording position, by the feed sections 35a, 35b of the first transport unit 36a abutting against the outer rim of the second disc 2S to cause rotation of the rotational members 34a, 34b in the opposite directions to each other, transport of the second disc 2S between the reproducing or recording position and the housing position is inhibited. That is, even if the second disc 2S is transported by the first transport unit 36a to the maximum extent in the direction indicated by arrow F in the drawing, the outer rim of the second disc 2S cannot get to the feed sections 38a, 38b of the rotational members 37a, 37b forming the second transport unit 36b, thus prohibiting the second disc 2S from getting to the housing position.

Figure 23:
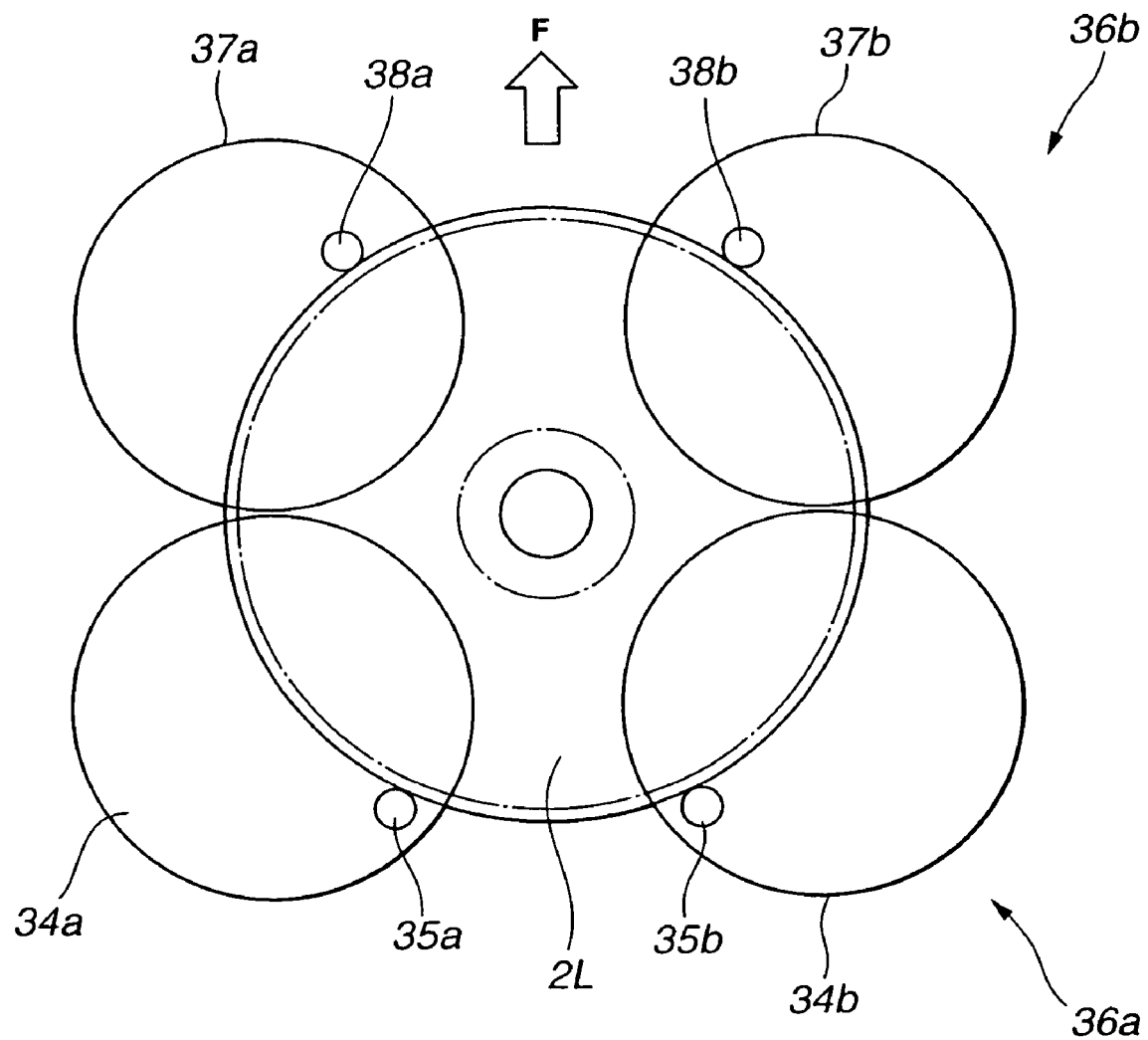
FIG. 23 is a plan view showing the state of transporting the first disc of a larger diameter to a recording and/or reproducing position.
Figure 24:
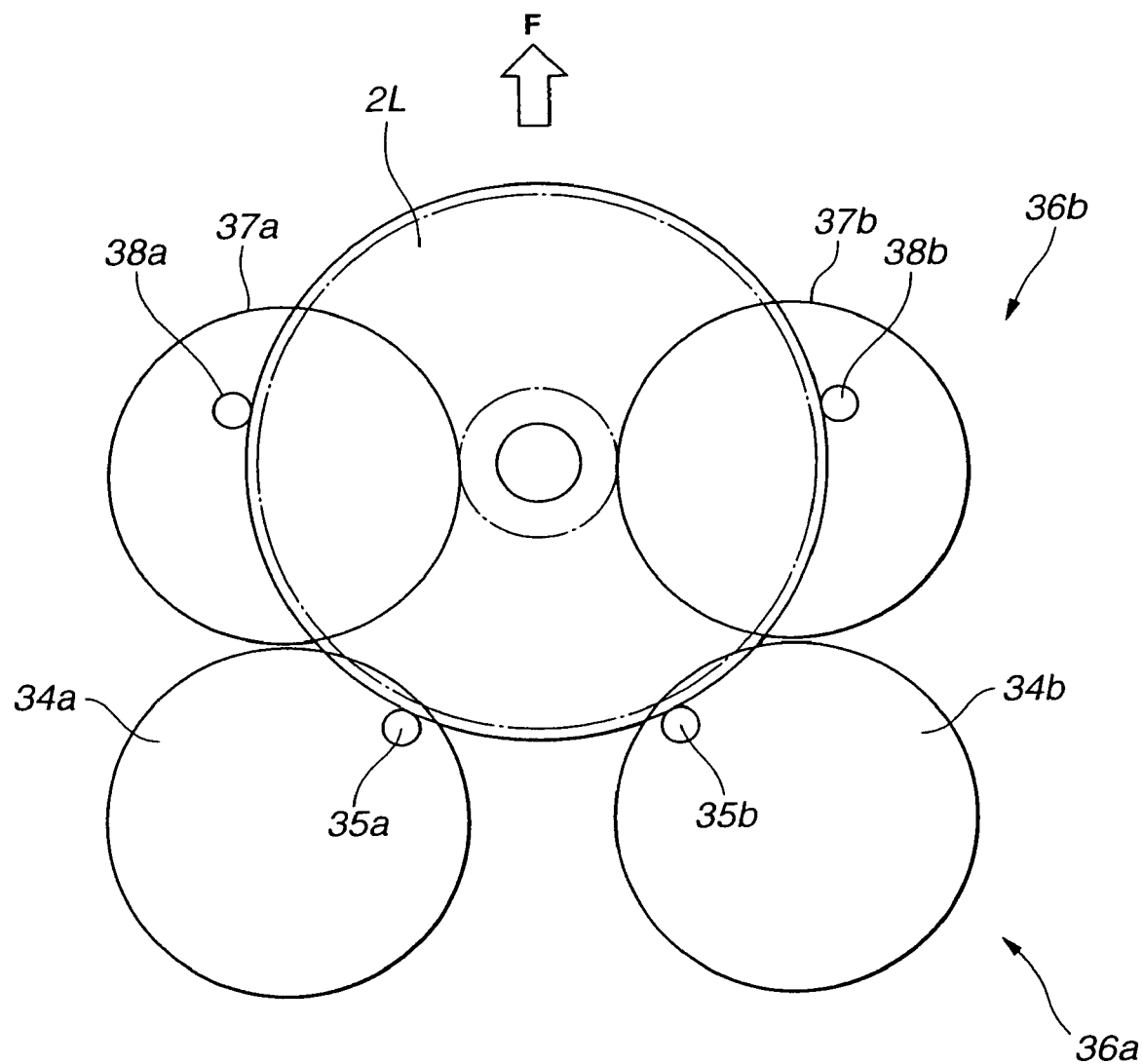
FIG. 24 is a plan view showing the state of transporting the first disc of a larger diameter to a housing position.

FIGS. 23 and 24 schematically illustrate the manner of transport of the first disc 2L. Specifically, FIG. 23 shows that the first disc 2L has been transported from the loading or eject position to the reproducing or recording position by the feed sections 35a, 35b of the first transport unit 36a contacted with the outer rim of the first disc 2L. FIG. 24 shows the state in which the first disc 2L is being transported from the reproducing or recording position towards the housing position by the second transport unit 36b As for the large diameter disc, that is the first disc 2L, the outer rim of the first disc 2L reaches the second transport unit 36b before the first disc 2L has traversed the marginal transport distance through which the first disc 2L can be transported in the direction indicated by arrow F by the rotational force applied to the rotational members 34a, 34b of the first transport unit 36a. Moreover, the first disc 2L reaches a position from which the first disc 2L can be transported towards the housing position under the rotational force of the rotational members 34a, 34b.

Figure 25:
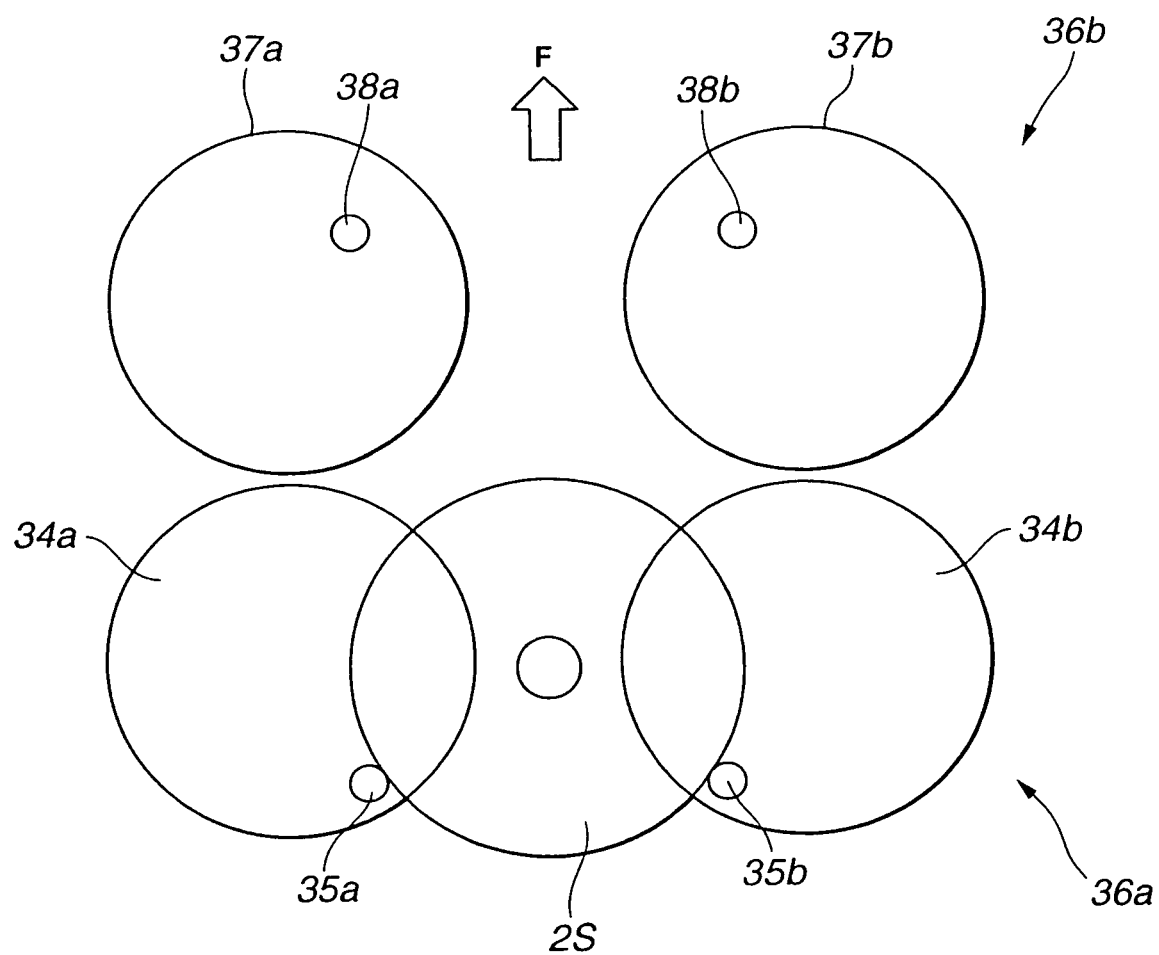
FIG. 25 is a plan view showing the state of transporting the second disc smaller in diameter than the first disc to a recording and/or reproducing position.
Figure 26:
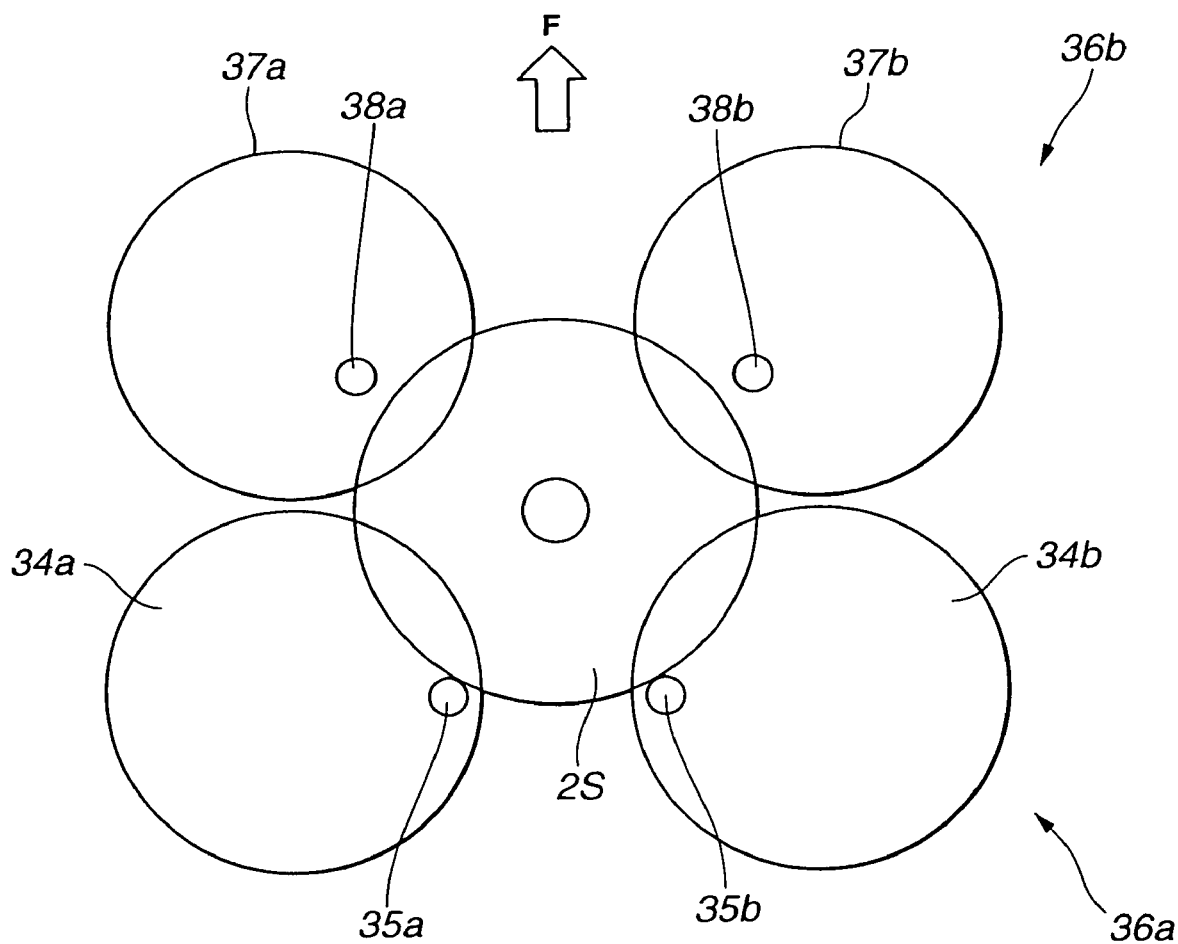
FIG. 26 is a plan view showing the state in which limitations have been imposed on movement of the second disc from the recording and/or reproducing position to the housing section.

FIGS. 25 and 26 schematically show the manner of transport of the small diameter second disc 2S. Specifically, FIG. 25 shows the state in which the second disc 2S is transported from the loading or eject position towards the reproducing or recording position, and FIG. 26 shows the state in which the second disc 2S is prohibited from being transported from the reproducing or recording position towards the housing position.

As for the small diameter disc, that is the second disc 2S, this disc does not reach a position from which the disc is transported by the second transport unit 36b to the housing section, even if the disc has traversed the marginal transport distance through which it can be fed in the direction indicated by arrow F under the rotational driving power by the first transport unit 36a, so that the second disc 2S is prohibited from being inadvertently fed to the housing section.

In the present configuration, the disc-shaped recording medium is transported as it has its outer rim clamped by the feed sections 35a, 35b and 38a, 38b from the lateral side. This configuration is meritorious in simplifying the structure because it is unnecessary to change the center-to-center distance of the paired rotational members 34a, 34b and 37a, 37b.

Meanwhile, in chucking the disc-shaped recording mediums of different diameters, as the center of rotation of the disc-shaped recording medium is coincident with the center of rotation of the turntable, by way of centering, it is necessary to provide means for positioning the respective disc-shaped recording mediums with different diameters. A typical example of this positioning means is shown in FIG. 27.

In the present example, the first disc 2L and the second disc 2S are centered by a mechanism employing a positioning lever 39, as the centers of rotation of the respective discs are coincident with each other. That is, the positioning lever 39 has its one end rotationally supported about a pivot of rotation indicated by a point C, and has abutment points 40 with the outer rim of the first disc 2L and the second disc 2S on an end opposite to the pivot of rotation C. The first disc 2L or the second disc 2S, moved or transported to the reproducing or recording unit 4, is detected by a detection unit 13. The detection unit 13 detects the difference in diameter of the disc moved or transported to the reproducing or recording unit 4 to determine whether the disc-shaped recording medium 2 so moved or transported is the first disc 2L or the second disc 2S.

Figure 27:
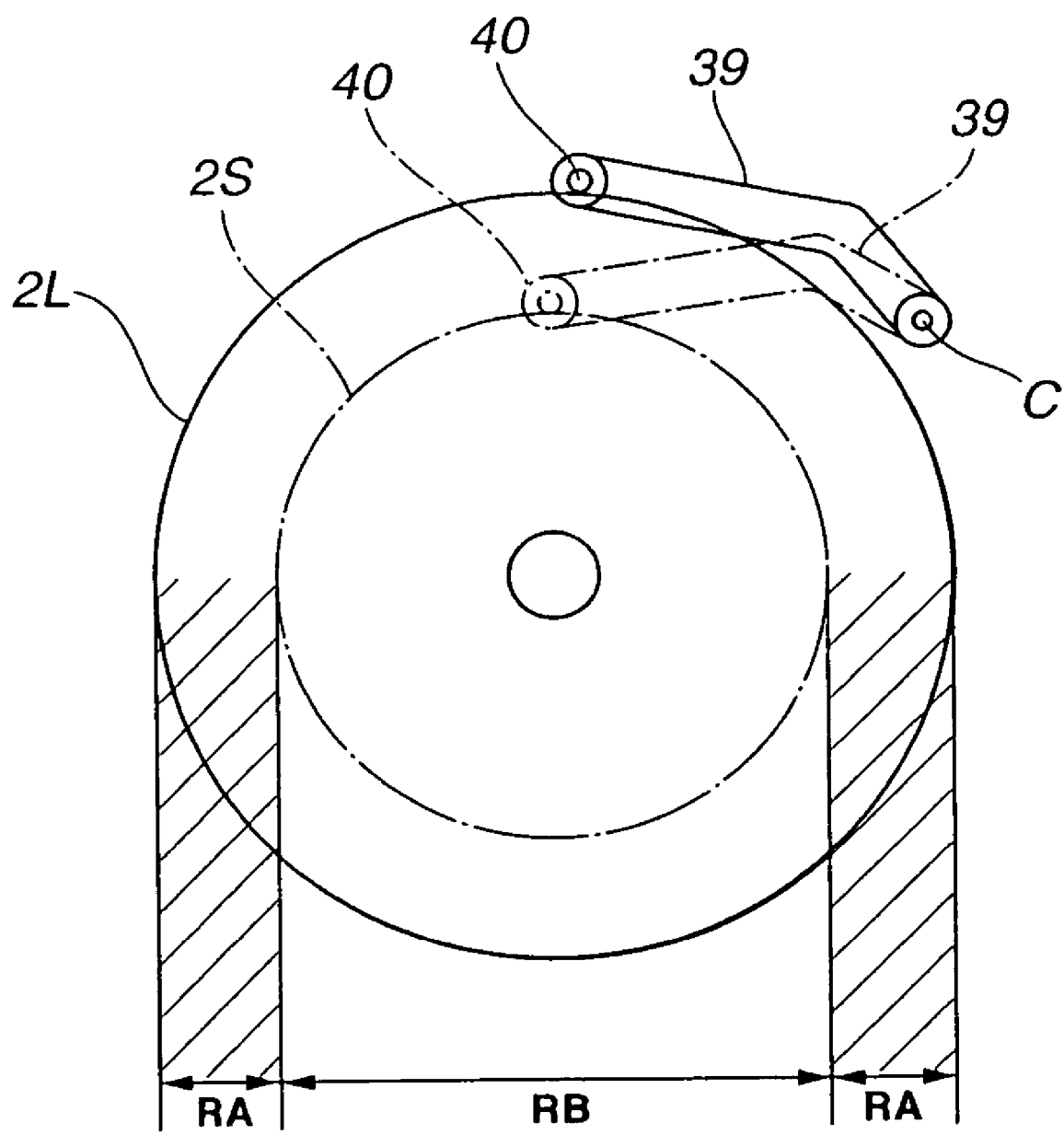
FIG. 27 is a plan view showing an instance of a positioning mechanism for a disc-shaped recording medium.

When the detection unit 13 has detected that the disc-shaped recording medium 2 moved or transported to the reproducing or recording unit 4 is the first disc 2L, the positioning lever 39 is rotated to a position indicated by a solid line in FIG. 27, to exercise control over the movement in a direction of housing the first disc 2L by its abutment 40.

When the detection unit 13 has detected that the disc-shaped recording medium 2 moved or transported to the reproducing or recording unit 4 is the second disc 2S, the positioning lever 39 is rotated to a position indicated by a chain-dotted line in FIG. 27, to exercise control over the movement in a direction of housing the second disc 2S by its abutment 40.

Of course, the movement control of the positioning lever 39 is operatively linked to the disc chucking operation, such that, after the end of the disc chucking, the positioning lever 39 is receded to an out-of-the-way position spaced apart from the first disc 2L or the second disc 2S.

For detecting the difference in diameter of the disc-shaped recording medium 2, moved or transported to the reproducing or recording unit 4, an optical sensor or a proximity sensor, making up the detection unit 13, is arranged within a range indicated by [RA] in FIG. 27, that is a range within the transport trajectory of the first disc 2L and outside the transport trajectory of the second disc 2S, whereby the difference in diameter of the disc-shaped recording medium 2 transported onto the reproducing or recording unit 4 may be discriminated based on the detection signal from the detection unit 13. For detecting the loading or non-loading of the transported first or second disc 2L, 2S to the reproducing or recording unit 4, it is sufficient to provide an optical sensor or proximity sensor of the detection unit 13 in a range indicated [RB] in FIG. 27, that is a range common to the transport trajectories of the first and second discs 2L, 2S.

Figure 28:
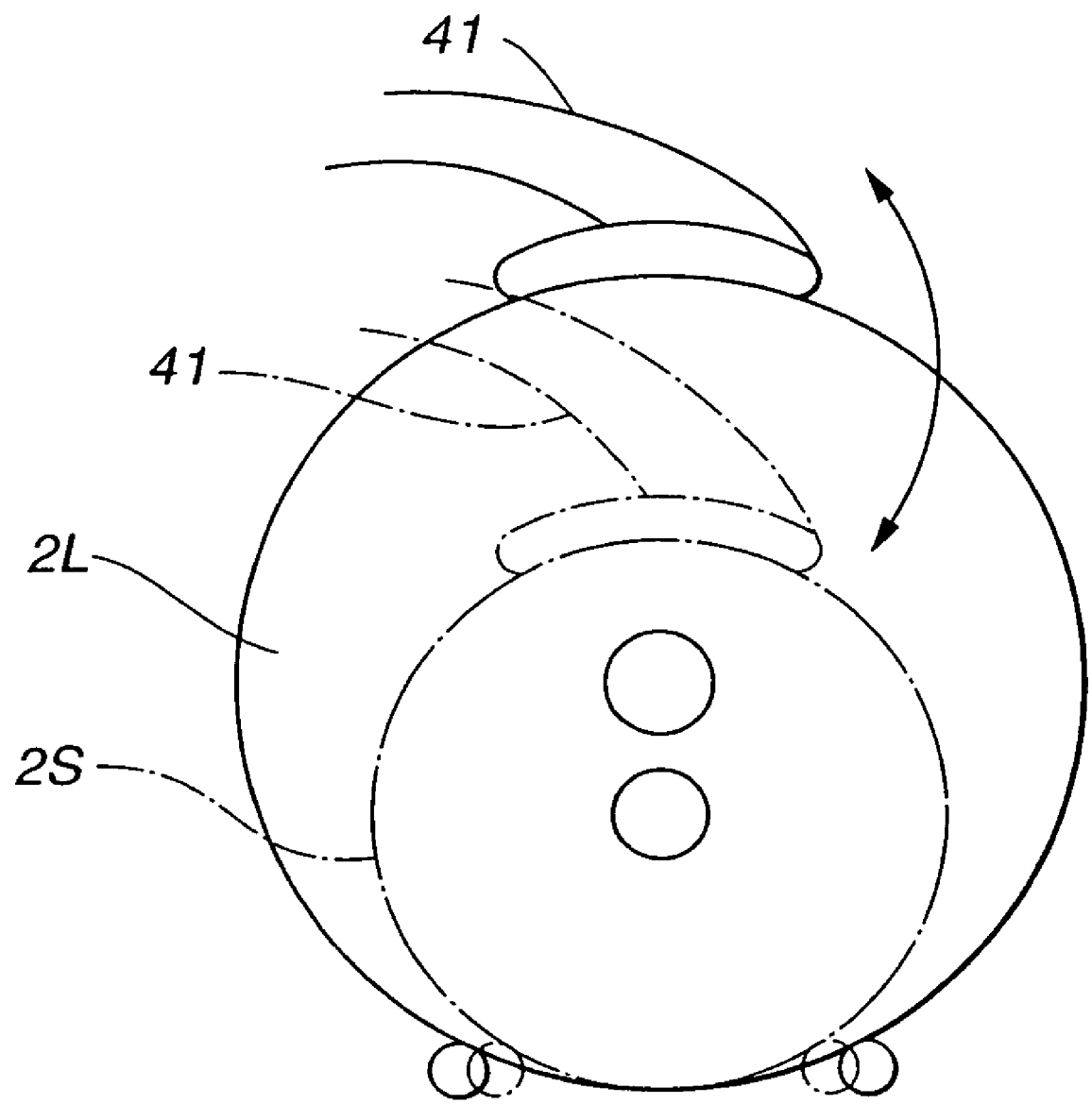
FIG. 28 is a plan view showing the state in which the center positions of the respective disc-shaped recording mediums of different diameters have become offset in positioning the disc-shaped recording mediums.

At a position of completion of centering of the first and second discs 2L, 2S relative to the reproducing or recording unit 4, the centers of the two are coincident, so that the center of first disc 2L is coincident with that of the second disc 2S and hence the discs 2L, 2S with different diameter can be chucked at the same location by the turntable 6 and the damper 8, thereby simplifying the mechanism of the reproducing or recording unit. For example, an end towards the outer rim of the first disc 2L or the second disc 2S may be supported by for example a feed roll and a positioning lever 41 may be abutted against the opposite end of the disc for exercising position control, as shown in FIG. 28. In this case, the center of rotation of the first disc 2L is not coincident with that of the second disc 2S, that is a small circle indicating the center opening of the first disc 2L and a small circle indicating the center opening of the second disc 2S cease to be coincident with each other, that is, the small circles indicating the center openings of the first and second discs 2L, 2S are offset relative to each other in the transport direction. Thus, disc chucking needs to be separately carried out taking into account the difference in the diameter of the first and second discs 2L, 2S, thus possibly complicating the mechanical structure. Consequently, such a structure is desirable in which the centers of the discs 2L, 2S is set at the same position to enable chucking without dependency upon the difference in diameter of the first and second discs 2L, 2S.

The above-mentioned structure gives rise to the following merits.

A plural number of sorts of the disc-shaped recording mediums with different diameters may e.g., be reproduced without necessitating complicated mechanisms, thus contributing to reduction in size or cost of the apparatus itself.

There is no risk that a disc-shaped recording medium of a diameter different from the design diameter be transported to the housing section by malfunction.

The disc-shaped recording mediums of different diameters may e.g., be reproduced without using an adapter for unifying the diameter of the disc-shaped recording medium used, thus improving the operational reliability.

Since the number of component parts to be added to the component parts for constituting a mechanism necessary in loading one of the disc-shaped recording mediums, for example, the large diameter disc-shaped recording medium, is small, the cost may be reduced, while the apparatus may be lightweight. The apparatus may also be reduced in thickness by employing a slot-in system.

The present invention is not limited to the embodiments described with reference to the drawings and, as may be apparent to those skilled in the art, various changes, substitutions or equivalents may be envisaged without departing from the scope and the purport of the invention as defined in the appended claims.

INDUSTRIAL APPLICABILITY

According to the present invention, described above, in which plural disc-shaped recording mediums of different diameters are transported from a loading position to a recording and/or reproducing position and thence to a housing section, and control is exercised over the transport of one of the disc-shaped recording mediums smaller in diameter from the recording and/or reproducing position to the housing position, there is no risk of a disc-shaped recording medium of a smaller diameter being housed in a housing section in the recording and/or reproducing apparatus along with the disc-shaped recording medium of a larger diameter. Thus, there is no risk of producing an inconvenience in taking out and transporting the disc-shaped recording medium accommodated in the housing section.

Since the control over the transport of the small-sized disc-shaped recording medium from the recording and/or reproducing position to the housing position is formed by a part of the transport mechanism, the mechanical structure is simplified, while the risk of the small-sized disc-shaped recording medium being transported by a malfunction to the housing position may be prohibited reliably. In addition, the apparatus may be reduced in thickness and in production cost.

The invention claimed is:

1. A transport apparatus for a disc-shaped recording medium comprising:
   a first transport mechanism configured to independently transport a first disc-shaped recording medium and a second disc-shaped recording medium smaller in diameter than the first disc-shaped recording medium, from a loading position to a reproducing or recording position; and
   a second transport mechanism arranged at a position spaced from said second disc-shaped recording medium transported to said reproducing or recording position, said second transport mechanism configured to independently transport said first disc-shaped recording medium, transported by said first transport mechanism to said reproducing or recording position, to a housing position,
   wherein said second transport mechanism is arranged at a position engaging with said first disc-shaped recording medium transported to said reproducing or recording position, and
   wherein said first transport mechanism and the second transport mechanism are spaced from each other a fixed distance larger than the diameter of said second disc-shaped recording medium and smaller than the diameter of said first disc-shaped recording medium.

2. The transport apparatus for a disc-shaped recording medium according to claim 1 wherein said first transport mechanism and the second transport mechanism are spaced from each other a distance larger than the diameter of said second disc-shaped recording medium and smaller than the diameter of said first disc-shaped recording medium.

3. The transport apparatus for a disc-shaped recording medium according to claim 1 wherein said first transport mechanism and the second transport mechanism are configured to clamp and transport said first disc-shaped recording medium or the second disc-shaped recording medium.

4. The transport apparatus for a disc-shaped recording medium according to claim 3 wherein said first transport mechanism includes a first rotational roll and a second rotational roll abutting against the outer peripheral end face of said first disc-shaped recording medium or the second disc-shaped recording medium from both sides of the transport direction from said loading position to said reproducing or recording position on both sides of the center of said first disc-shaped recording medium or the second disc-shaped recording medium, and wherein said second transport mechanism includes a third rotational roll and a fourth rotational roll abutting against the outer peripheral end face of said first disc-shaped recording medium or the second disc-shaped recording medium from both sides of the transport direction from said loading position to said reproducing or recording position on both sides of the center of said first disc-shaped recording medium or the second disc-shaped recording medium.

5. The transport apparatus for a disc-shaped recording medium according to claim 4 wherein said first and second rotational rolls of said first transport mechanism and said third and fourth rotational rolls of said second transport mechanism are arranged at a spacing larger than the diameter of said second disc-shaped recording medium and at a spacing smaller than the diameter of said first disc-shaped recording medium.

6. A recording and/or reproducing apparatus for a disc-shaped recording medium comprising:
 a first transport mechanism configured to independently transport a first disc-shaped recording medium and a second disc-shaped recording medium smaller in diameter than the first disc-shaped recording medium from a loading position to a reproducing or recording position;
 a second transport mechanism arranged at a position spaced apart from the second disc-shaped recording medium transported to said reproducing or recording position, said second transport mechanism configured to independently transport the first disc-shaped recording medium, transported by said first transport mechanism to said reproducing or recording position, to a housing position;
 a reproducing or recording unit configured to reproduce or record the disc-shaped recording medium transported by said first transport mechanism to said reproducing or recording position; and
 a housing section configured to house said first disc-shaped recording medium transported by said second transport mechanism,
 wherein said second transport mechanism is arranged at a position engaging with said first disc-shaped recording medium transported to said reproducing or recording position, and
 wherein said first transport mechanism and the second transport mechanism are spaced from each other a fixed distance larger than the diameter of said second disc-shaped recording medium and smaller than the diameter of said first disc-shaped recording medium.

7. The recording and/or reproducing apparatus according to claim 6 wherein said first disc-shaped recording medium or the second disc-shaped recording medium is transported substantially horizontally by said first transport mechanism and the second transport mechanism between said loading position, said reproducing or recording position and the housing position.

8. The recording and/or reproducing apparatus according to claim 7 wherein said first transport mechanism and the second transport mechanism are arranged at a distance larger than the diameter of said second disc-shaped recording medium and smaller than the diameter of said first disc-shaped recording medium.

9. The recording and/or reproducing apparatus according to claim 6 wherein said first transport mechanism and the second transport mechanism are configured to clamp and transport said first disc-shaped recording medium or the second disc-shaped recording medium.

10. The recording and/or reproducing apparatus for a disc-shaped recording medium according to claim 9 wherein said first transport mechanism includes a first rotational roll and a second rotational roll abutting against the outer peripheral end face of said first disc-shaped recording medium or the second disc-shaped recording medium from both sides of the transport direction from said loading position to said reproducing or recording position on both sides of the center of said first disc-shaped recording medium or the second disc-shaped recording medium, and wherein said second transport mechanism includes a third rotational roll and a fourth rotational roll abutting against the outer peripheral end face of said first disc-shaped recording medium or the second disc-shaped recording medium from both sides of the transport direction from said loading position to said reproducing or recording position on both sides of the center of said first disc-shaped recording medium or the second disc-shaped recording medium.

11. The recording and/or reproducing apparatus for a disc-shaped recording medium according to claim 10 wherein said first and second rotational rolls of said first transport mechanism and said third and fourth rotational rolls of said second transport mechanism are arranged at a spacing larger than the diameter of said second disc-shaped recording medium and smaller than the diameter of said first disc-shaped recording medium.

* * * * *